United States Patent
Singaraju et al.

(10) Patent No.: US 12,106,055 B2
(45) Date of Patent: Oct. 1, 2024

(54) TECHNIQUES FOR PROVIDING EXPLANATIONS FOR TEXT CLASSIFICATION

(71) Applicant: Oracle International Corporation, Redwood Shores, CA (US)

(72) Inventors: Gautam Singaraju, Dublin, CA (US); Vishal Vishnoi, Redwood City, CA (US); Manish Parekh, San Jose, CA (US); Alexander Wang, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 470 days.

(21) Appl. No.: 17/407,692

(22) Filed: Aug. 20, 2021

(65) Prior Publication Data
US 2022/0058347 A1  Feb. 24, 2022

Related U.S. Application Data

(60) Provisional application No. 63/174,336, filed on Apr. 13, 2021, provisional application No. 63/068,608, filed on Aug. 21, 2020.

(51) Int. Cl.
*G06F 40/35* (2020.01)
*G06F 40/205* (2020.01)
(Continued)

(52) U.S. Cl.
CPC .............. *G06F 40/35* (2020.01); *G06F 40/40* (2020.01); *G06F 40/205* (2020.01); *G10L 15/1815* (2013.01); *G10L 15/22* (2013.01)

(58) Field of Classification Search
CPC ........ G06F 40/35; G06F 40/40; G06F 40/205; G10L 15/1815; G10L 15/22; G06N 5/01; G06N 5/045; G06N 20/00; H04L 51/02
See application file for complete search history.

(56) References Cited

U.S. PATENT DOCUMENTS

| | | | |
|---|---|---|---|
| 11,626,106 B1* | 4/2023 | Ping .................. | G10L 15/22 704/235 |
| 2012/0041903 A1 | 2/2012 | Beilby et al. | |

(Continued)

FOREIGN PATENT DOCUMENTS

KR          102047385 B      11/2019

OTHER PUBLICATIONS

International Application No. PCT/US2021/046938, International Search Report and Written Opinion mailed on Dec. 9, 2021, 9 pages.
(Continued)

*Primary Examiner* — Pierre Louis Desir
*Assistant Examiner* — Keisha Y. Castillo-Torres
(74) *Attorney, Agent, or Firm* — Kilpatrick Townsend & Stockton LLP

(57) ABSTRACT

A chatbot system is configured to execute code to perform determining, by the chatbot system, a classification result for an utterance and one or more anchors each anchor of the one or more anchors corresponding to one or more anchor words of the utterance. For each anchor of the one or more anchors, one or more synthetic utterances are generated, and one or more classification results for the one or more synthetic utterances are determined. A report is generated by the chatbot system comprising a representation of a particular anchor of the one or more anchors, the particular anchor corresponding to a highest confidence value among the one or more anchors. The one or more synthetic utterances may be used to generate a new training dataset for training a machine-learning model. The training dataset may be refined according to a threshold confidence values to filter out datasets for training.

10 Claims, 21 Drawing Sheets

(51) Int. Cl.
  *G06F 40/40* (2020.01)
  *G10L 15/18* (2013.01)
  *G10L 15/22* (2006.01)

(56) References Cited

U.S. PATENT DOCUMENTS

| | | |
|---|---|---|
| 2013/0066632 A1 | 3/2013 | Conkie et al. |
| 2014/0316764 A1 | 10/2014 | Ayan et al. |
| 2016/0148610 A1* | 5/2016 | Kennewick, Jr. ....... G10L 15/18 704/240 |
| 2019/0303237 A1* | 10/2019 | Chauhan ............. G06F 11/0793 |
| 2020/0227032 A1* | 7/2020 | Toplyn ................... G06F 40/56 |
| 2020/0257857 A1* | 8/2020 | Peper ...................... G06F 40/35 |

OTHER PUBLICATIONS

"5.7 Local Surrogate (LIME)", Interpretable Machine Learning, Available Online at: https://christophm.github.io/interpretable-ml-book/lime.html, Accessed from Internet on Aug. 25, 2020, 10 pages.

Goerke et al., "5.8 Scoped Rules (Anchors)", Interpretable Machine Learning, Available Online at: https://christophm.github.io/interpretable-ml-book/anchors.html, Accessed from Internet on Aug. 25, 2020, 12 pages.

Ma, "Anchor your Model Interpretation by Anchors", Towards Data Science, Available Online at: https://towardsdatascience.com/anchor-your-model-interpretation-by-anchors-aa4ed7104032, Sep. 9, 2018, 6 pages.

Ribeiro et al., ""Why Should I Trust You?" Explaining the Predictions of Any Classifier", KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.

Ribeiro et al., "Anchors: High-Precision Model-Agnostic Explanations", Association for the Advancement of Artificial Intelligence, Available Online at: https://homes.cs.washington.edu/~marcotcr/aaai18.pdf, 2018, 9 pages.

International Application No. PCT/US2021/046938, International Preliminary Report on Patentability mailed Mar. 2, 2023, 6 pages.

* cited by examiner

FIG. 12

Analysis Utterances Suggestions History

- ⊘ add another song to the Cita Romntica playlist ×
- ⊘ include this in the song list ×

| | |
|---|---|
| Utterance Explanation | View JSON |
| Utterance | add another song to the Cita Romntica playlist |
| Number of Words | 8 |
| Predicted Intents | AddToPlaylist  1210 |
| Confidence Threshold | 0.7  Change |
| Keyword List Size | 2 |
| Keyword List | playlist, song |

1250

| Utterance | Predicted Intent 1240 | Confidence Score | Add to Intent |
|---|---|---|---|
| ☐ Add that song toward some Cita Romntica playlist | AddToPlaylist | 0.94 | AddToPlaylist ▸ |
| ☐ Add this song until another Cita Romntica playlist | AddToPlaylist | 0.93 | AddToPlaylist ▸ |
| ☐ Add that song past that Cita Comntica playlist | AddToPlaylist | 0.89 | AddToPlaylist ▸ |
| ☐ Add another song into both Cita Romntica playlist | AddToPlaylist | 0.88 | AddToPlaylist ▸ |
| ☐ Add an song without the Cita Romntica playlist | AddToPlaylist | 0.87 | AddToPlaylist ▸ |
| ☐ Add each song because these Cita Comntica playlist | AddToPlaylist | 0.86 | AddToPlaylist ▸ |
| ☐ Add any song before an Cita Romntica playlist | AddToPlaylist | 0.81 | AddToPlaylist ▸ |
| ☐ Add some song within each Cita Romntica playlist | AddToPlaylist | 0.79 | AddToPlaylist ▸ |
| ☐ Add another song over every Cita Romntica playlist | AddToPlaylist | 0.77 | AddToPlaylist ▸ |
| ☐ Add every song within that Cita Romntica playlist | AddToPlaylist | 0.76 | AddToPlaylist ▸ |

Utterances with Similar Predictions  1230   Utterances with Dissimilar Predictions Last updated a few seconds ago ↻

Add Example 1200  1220

FIG. 13

View [Last 30 Days ▼] Channels [Matches one of ▼] [All ▼] Locale [Matches one of ▼] [All ▼]  Last updated a few seconds ago ↻

Overview  Intents  Paths  Conversations Retrainer

Show all utterances where [All] [Any] of the following are true:

[Intent ▼] [Matches ▼] [unresolvedIntent ×]

+ Criteria

Intent Performance

| ☐ Utterances | Result | Win Margin | Intents Score | Add To |
|---|---|---|---|---|
| ▸ ☑ add another song to the Cita Romntica playlist | unresolvedIntent | 86.65 | ■ unresolvedIntent<br>☐ Ask another question<br>☐ Anytime Feedback<br>☐ Directory | [Ask another question ▼] Suggested |
| ▸ ☑ include this in the song list | unresolvedIntent | 67.78 | ■ unresolvedIntent<br>☐ Performance Evaluation<br>☐ Benefits Coverage<br>☐ Anytime Feedback | [Performance Evaluation ▼] Suggested |
| ▸ ☐ add some sons | unresolvedIntent | 67.08 | ■ unresolvedIntent<br>☐ Anytime Feedback<br>☐ Benefits Coverage<br>■ Future Scheduled Absences | [Anytime Feedback ▼] Suggested |
| ▸ ☐ put into the playif thanks | unresolvedIntent | 62.98 | ■ unresolvedIntent<br>☐ Onboarding<br>☐ Manager Self-Service<br>■ Payslip | [Onboarding ▼] Suggested |
| ▸ ☐ include this song | unresolvedIntent | 61.27 | ■ unresolvedIntent<br>■ Future Scheduled Absences<br>☐ Onboarding<br>☐ Manager Self-Service | [Onboarding ▼] Suggested |

Page [1] of 4 (1-5 of 16 items) K | < [1] 2 3 4 > >|     [Add to Analyze Queue] [Add Example]

View [Last 30 Days ▼] [Channels|Matches one of ▼] [All ▼] [Locale|Matches one of ▼] [All ▼]

Overview  Intents  Paths  Conversations  Retrainer

ⓘ Information  ✕
Utterance added to queue for analysis

Show all utterances where [All | Any] of the following are true:

[Intent ▼] [Matches ▼] [unresolvedIntent ✕]

[+ Criteria]

Intent Performance

| ☐ | Utterances | Result | Win Margin | Intents Score | | Add To | |
|---|---|---|---|---|---|---|---|
| ▶ ☑ | add another song to the Cita Romntica playlist | unresolvedIntent | 86.65 | ▬▬▬ | ■ unresolvedIntent<br>□ Ask another question<br>□ Anytime Feedback<br>□ Directory | [Ask another question ▼] | Suggested |
| ▶ ☑ | include this in the song list | unresolvedIntent | 67.78 | ▬▬▬ | ■ unresolvedIntent<br>□ Performance Evaluation<br>□ Benefits Coverage<br>■ Anytime Feedback | [Performance Evaluation ▼] | Suggested |
| ▶ ☐ | add some sons | unresolvedIntent | 67.08 | ▬▬▬ | ■ unresolvedIntent<br>□ Anytime Feedback<br>■ Benefits Coverage<br>□ Future Scheduled Absences | [Anytime Feedback ▼] | Suggested |
| ▶ ☐ | put into the playst thanks | unresolvedIntent | 62.98 | ▬▬▬ | ■ unresolvedIntent<br>□ Onboarding<br>■ Manager Self-Service<br>□ Payslip | [Onboarding ▼] | Suggested |
| ▶ ☐ | include this song | unresolvedIntent | 61.27 | ▬▬▬ | ■ unresolvedIntent<br>□ Future Scheduled Absences<br>□ Onboarding<br>■ Manager Self-Service | [Onboarding ▼] | Suggested |

Page [1] of 4 (1-5 of 16 items)  |◁  ◁ [1] 2 3 4 ▷ ▷|      [Add to Analyze Queue] [Add Example]

FIG. 16

TECHNIQUES FOR PROVIDING EXPLANATIONS FOR TEXT CLASSIFICATION

CROSS-REFERENCE TO RELATED APPLICATIONS

This application is a non-provisional of, and claims the benefit and priority under 35 U.S.C. 119(e) of U.S. Provisional Application No. 63/068,608, filed on Aug. 21, 2020 and U.S. Provisional Application No. 63/174,336, filed on Apr. 13, 2021. The entire contents of the aforementioned applications are incorporated herein by reference in their entirety for all purposes.

FIELD

The present disclosure relates generally to chatbot systems, and more particularly, to techniques for providing explanations for text classification.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots (also referred to hereinafter as "bots" or "skills") have thus begun to be developed to engage in conversations with end users, especially over the Internet. End users or customers can communicate with bots through messaging applications that the end users have already installed and used. An intelligent bot, generally powered by artificial intelligence (AI), can communicate more intelligently and contextually in live conversations, and thus may allow for a more natural conversation between the bot and the end users for improved conversational experience. Rather than the end user learning a fixed set of keywords or commands that the bot knows how to respond to, an intelligent bot may be able to understand the end user's intention based upon user utterances in natural language and respond accordingly.

However, chatbots are difficult to build because these automated solutions require specific knowledge in certain fields and the application of certain techniques that may be solely within the capabilities of specialized developers. As part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions.

Despite widespread adoption, machine learning models, including neural network models, generally operate as black boxes that make inferences (outputs) by performing certain mathematical or logic operations on input data. The output of a machine learning model may include, for example, a prediction or classification, and/or the corresponding confidence level. However, the outputs of the machine learning model or the output for a particular inference may not provide insights into the machine learning model such that a user may understand the behavior of the machine learning model, such as why a particular input would generate a particular output, to determine whether a model and/or a particular prediction is trustworthy and how to improve the training data and the model. Additionally, training sets developed for a machine learning model are often manually generated and then input to a machine learning model. Time for training or retraining machine learning models may be constrained by the ability to generate these training sets. There is no comprehensive way to integrate an inference explanation system into a retraining system to improve a machine learning model.

SUMMARY

Techniques disclosed herein relate generally to chatbots. More specifically and without limitation, techniques disclosed herein relate to techniques for providing explanations for text classifications in, for example, a chatbot. A chatbot can classify user utterances into different classes, such as predefined intents of the users. The classifier of the chatbot may include a trained ML model that generates outputs (e.g., intents) based on inputs (e.g., user utterances). The classification is generally a black box which lacks interpretability and explainability.

Techniques disclosed herein provide the explanations for the classifications, such that the chatbot owner may determine whether a classifier and/or a particular classification is trustworthy and how to improve the training utterances and the classifier based on the explanations. Various embodiments are described herein, including methods, systems, non-transitory computer-readable storage media storing programs, code, or instructions executable by one or more processors, and the like.

According to various embodiments, a computer-implemented method is provided that includes receiving, by a chatbot system, a request to explain an inference result for an utterance by an intent classifier of the chatbot system; obtaining, from the intent classifier, the inference result for the utterance; selecting one or more anchors based on the utterance, each anchor of the one or more anchors including one or more anchor words from the utterance; for each anchor of the one or more anchors, varying one or more words of the utterance that are not anchor words for the anchor to generate variations of the utterance; obtaining, from the intent classifier, inference results for the variations of the utterance; determining, based on the inference result for the utterance and the inference results for the variations of the utterance, a respective confidence level associated with each anchor of the one or more anchors; and generating an report that includes an anchor with a highest confidence level among the one or more anchors.

In some embodiments, determining the confidence level includes determining a match or a mismatch between the inference result for the utterance and each of the inference results for the variations of the utterance.

In some embodiments, selecting the one or more anchors includes selecting the one or more anchors in one or more rounds using a beam search technique.

In some embodiments, the report includes a JavaScript Object Notation (JSON) file.

In some embodiments, the report includes anchors with confidence levels greater than a threshold value.

In some embodiments, the computer-implemented method further comprises storing the variations of the utterance and the inference results for the variations of the utterance in a database or cloud based storage structure.

According to various embodiments, a computer-implemented method is provided that includes receiving, by a chatbot system, a plurality of training results comprising a plurality of utterances and a plurality of corresponding confidence values; comparing the plurality of training results to a threshold value; obtaining, based on the comparison, one or more utterances having a confidence value less than or equal to the threshold value; determining one or more training categories corresponding to the one or more obtained utterances; and training, based on the one or more training categories, a machine learning model using the one or more utterances.

In some embodiments, the computer-implemented method further comprises determining each corresponding confidence value of the plurality of corresponding confidence values based on a match or a mismatch between an utterance of the plurality of utterances and a corresponding predicted training category for the utterance.

In some embodiments, the computer-implemented method further comprises generating one or more synthetic utterances based on the plurality of utterances of the plurality of training results.

In some embodiments, the computer-implemented method further comprises generating one or more synthetic utterances based on the one or more obtained utterances.

In some embodiments, determining the one or more training categories comprises receiving input indicating a particular utterances of the one or more utterances and a particular corresponding training category of the one or more training categories.

In some embodiments, the computer-implemented method further comprises receiving input indicating the threshold value. The input may be received from a user of an interactive interface by inputting the threshold value into an interactive interface element.

In some embodiments, the one or more training categories are one or more correct intents, each correct intent of the one or more correct intent corresponding to an utterances of the one or more utterances for retraining the machine learning model.

In some embodiments, comparing the plurality of training results to a threshold value comprises calculating at least one or more difference values representing a numerical difference between at least the one or more confidence values and the threshold value, and obtaining the one or more utterances comprises selecting utterances having a difference value indicating the confidence value is less than or equal to the threshold value.

In some embodiments, the computer-implemented method further comprises grouping the one or more utterances into a training batch and inputting the training batch into the machine learning model.

In some embodiments, the machine learning model is constructed as an intent classifier comprising a plurality of model parameters learning by use of an object function, and training the machine learning model comprises minimizing or maximizing the objective function, which measures a difference between predicted intents and correct intents.

According to various embodiments, a system is provided that includes one or more data processors and a non-transitory computer readable storage medium containing instructions which, when executed on the one or more data processors, cause the one or more data processors to perform part or all of one or more methods disclosed herein.

According to various embodiments, a computer-program product is provided that is tangibly embodied in a non-transitory machine-readable storage medium and that includes instructions configured to cause one or more data processors to perform part or all of one or more methods disclosed herein.

In some embodiments, a plurality of utterances used to train a machine learning model are compared against a confidence threshold. A number of utterances having a confidence value at or below the confidence threshold are determined. The number of utterances are presented in a comprehensive user interface for selecting a correspondence between an expected intent of a particular utterance for retraining a machine learning model. The number of utterances are altered by an utterance generation engine to form one or more altered utterance which are used to retrain a machine learning model. The one or more altered utterances may also be presented in the comprehensive user interface to select the same, or a different expected intent for retraining. The utterances may be displayed as part of a comprehensive retraining interface for interpreting intent classification explanations and generating retraining data sets for refining a machine learning model.

Techniques and infrastructures disclosed herein may allow bot designers to understand why an utterance is classified into a particular class by showing the relative importance of words in the utterance, which may allow the bot designers to improve the classifiers of the bots for future utterance classification.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 12 illustrates an example interface for retraining models using artificial utterances according to various embodiments.

FIG. 13 illustrates an example interface for retraining models using artificial utterances according to various embodiments.

FIG. 14 illustrates an example interface for explaining an inference result according to various embodiments.

FIG. 15 illustrates an example interface for explaining an inference result according to various embodiments.

FIG. 16 illustrates an example interface for explaining an inference result according to various embodiments.

DETAILED DESCRIPTION

Introduction

Figure 1:
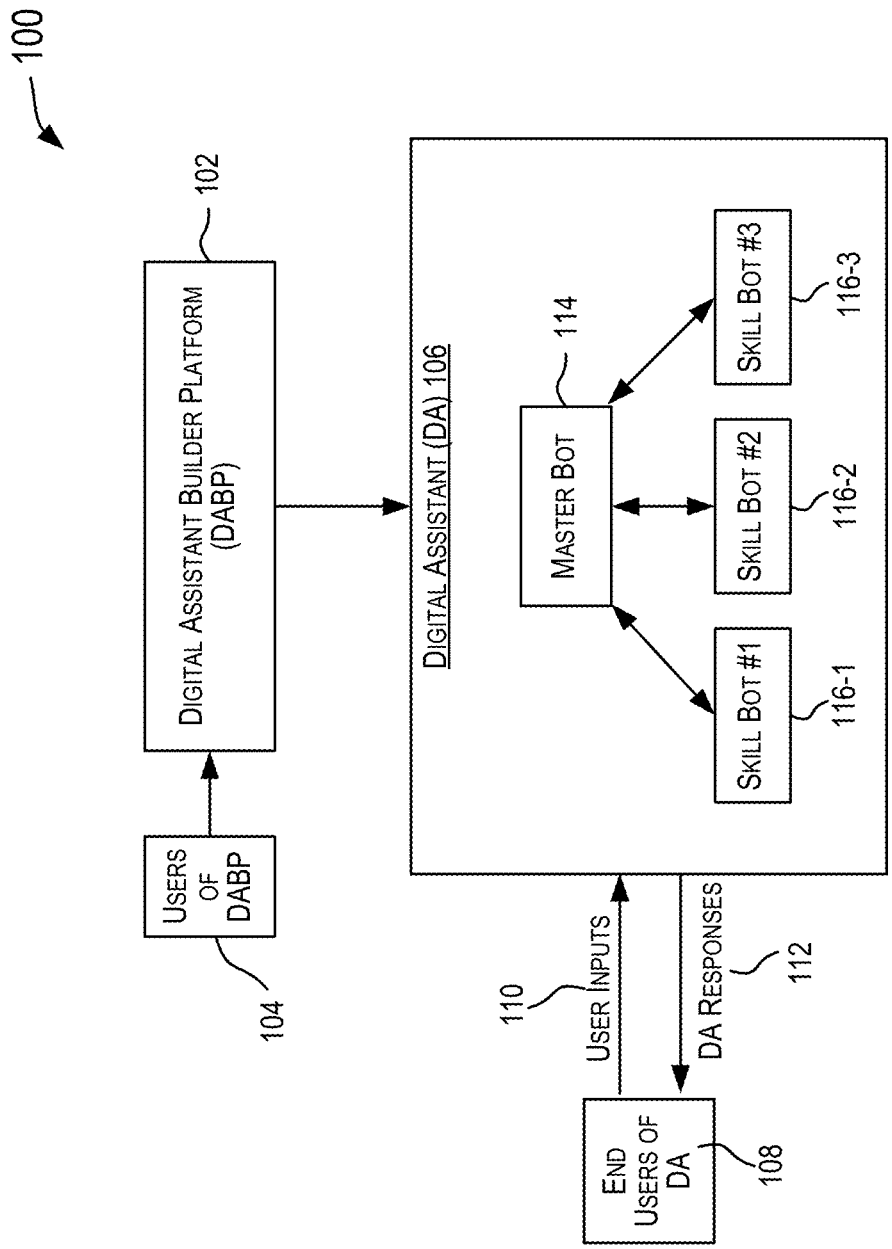
FIG. 1 is a simplified block diagram of a distributed environment incorporating an exemplary embodiment.

The present disclosure relates generally to chatbots. More specifically and without limitation, techniques disclosed herein relate to providing explanations for text classifications in a chatbot. A chatbot may classify user utterances into different classes, such as certain predefined intents of the users. The classifier is generally a black box that lacks interpretability and explainability. A user may know the classification results but may not understand why particular inputs are classified into corresponding classes. Techniques disclosed herein can provide the explanations for the classifications, such that training utterances and the classifier can be improved based on the explanations and users may gain confidence in the classification results. Various embodiments are described herein, including methods, systems, non-transitory computer-readable storage media storing programs, code, or instructions executable by one or more processors, and the like.

Enterprises may want to create chatbot systems for various purposes. A chatbot system may include one or more user intent classification engines for identifying end user intents based on user utterances, and one or more dialog engines for intelligently and contextually composing messages to respond to user utterances according to the determined end user intents. However, it is a challenging task to build the chatbot system, including both the user intent classification engines that can determine the end users' intents based upon user utterances and the dialog engines for intelligently and contextually generating responses, in part due to the subtleties and ambiguity of natural languages and the dimension of the input space (e.g., possible user utterances) and the size of the output space (number of intents).

The classifier of the chatbot may include a trained machine learning (ML) model that infers end user intents from end user utterances. The ML model generally operates as a black box that generates outputs (e.g., intents) based on inputs (e.g., user utterances) by performing certain mathematical or logic operations on the inputs. The ML model generally lacks interpretability and explainability, meaning that a chatbot owner lacking specific knowledge of how the chatbot is built may not understand why the chatbot generates certain outputs given certain inputs. More specifically, the output of the ML model may include, for example, a classification (or another prediction) and/or the corresponding confidence level for that prediction (i.e., how closely the chatbot determines the predicted output intent to match the utterance input), but may not provide insights into the ML model such that a user may understand the behavior of the model, such as why a particular input would generate a particular output, to determine whether the ML model and/or a particular prediction is trustworthy and how to improve the training data and the ML model.

In addition, there is no way to automatically and comprehensively generate and use training data which remedies determined behavioral problems with ML models. For example, give a report, a client may understand how a ML model may have made certain erroneous predictions, but will still be left with an erroneous model. The client may attempt to remedy these problems by seeking out a new training dataset, or attempting to create their own training dataset to retrain the ML model. The client has no way of knowing that any training dataset they find or create will remedy the specific problems presented in the report.

Accordingly, a different approach is needed to address these problems. In various embodiments, a computer-implemented method is provided that includes receiving a request to explain an inference result for an utterance by an intent classifier of a chatbot system; obtaining the inference result for the utterance from the intent classifier; selecting one or more anchors, where each anchor of the one or more anchors may include one or more anchor words in the utterance; for each anchor of the one or more anchors, varying one or more words of the utterance that are not anchor words for the anchor to generate variations of the utterance; obtaining inference results for the variations of the utterance from the intent classifier; determining, based on the inference results for the utterance and the variations of the utterance, a confidence level associated with each anchor of the one or more anchors; and generating an report that includes an anchor with a highest confidence level among the one or more anchors. In some embodiments, selecting the one or more anchors may include selecting the one or more anchors in one or more rounds using a beam search technique. The variations of the utterance, the inference results for the variations of the utterance, and the report may be in a database.

The techniques disclosed herein provide the explanations for the classifications, such that the chatbot owner may determine whether a classifier and/or a particular classification is trustworthy (so as to take an action based on the classification or prediction) and how to improve the training utterances and the classifier based on the explanation. For example, using the new utterances utilized in generating the report, the ML model may be retrained. The new utterances resemble the original utterance for which the report was sought. Therefore, given a known intent that should be predicted given the new utterance as input, the new utterance may be used to retrain the ML model to improve future predictions. Because the new utterances have already been generated, and because they resemble the original utterance for which the report was sought, the new utterances may be used to retrain the ML model in more efficient and functional manner.

As used herein, a "chatbot," "bot," "skill," or "skill bot" may refer to a computer program designed to simulate conversation with human end users, especially over the Internet. Individual skills may be designed to interact with end users and fulfill specific types of tasks, such as ordering food, making reservations, changing contact information, technical support, and customer service. Each skill may help an end user complete a task through a combination of visual, audio, or text messages and UI elements such as buttons, tables, lists, or the like.

As used herein, the term "intents" may refer to categories of actions or tasks that end users expect a skill to perform for them. The term "entities" may refer to variables that identify, from user inputs, information that enables the skill to fulfill a task. The term "components" may refer to various functions that a skill may use to respond to end users, such as outputting text, returning information from a backend, and performing custom logic. The term "dialog flow" may refer to the definition of a skill-user interaction and may describe how a skill responds and behaves according to user inputs. The term "channels" may refer to platform-specific configurations to allow the skills to access messaging platforms or client messaging apps. A single skill may have several channels configured for it such that it can simultaneously run on different services or platforms that the end users may prefer to use.

As used herein, an "utterance" or a "message" may refer to one or more sentences exchanged during a conversation, where a conversation may refer to a communication session that may include one or more utterances or messages. A conversation may include one or more stages or states. A conversation flow may be an abstraction of multiple conversations that include the same stages or states and the same transitions from stage (or state) to stage (or state). Each conversation may be a specific instance of a corresponding conversation flow. A state (or stage) of a conversation (or conversation flow) may be associated with a state of a state machine maintained by a bot system for conducting conversations with other bot systems or persons. In some cases, a state may correspond to an intent or goal of an end user. As used herein, an end user may refer to an end user of a bot system, such as a person or another entity that engages in a conversation with a bot system through a messaging application or platform. For example, an end user may be a customer or a client of an enterprise that owns the bot system. As used herein, a user of a bot system may refer to an owner, an operator, an administrator, or a developer of the bot system.

In the following description, for the purposes of explanation, specific details are set forth in order to provide a thorough understanding of examples of the disclosure. However, it will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of a distributed environment 100 incorporating an exemplary embodiment. Distributed environment 100 includes a digital assistant builder platform (DABP) 102 that enables enterprises to create and deploy digital assistants for their end users. DABP 102 can be used to create one or more digital assistants (DAs). DABP 102 can be used by multiple enterprises to create digital assistants for their end users. For example, as shown in FIG. 1, a user 104 representing a particular enterprise can use DABP 102 to create and deploy a digital assistant 106 for end users of the particular enterprise. For example, a restaurant (e.g., a pizza shop) may use DABP 102 to create and deploy a digital assistant that enables customers of the restaurant to order food (e.g., order pizza).

For purposes of this disclosure, a "digital assistant" refers to an entity that helps end users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system.

For example, as shown in FIG. 1, end users 108 may use digital assistant 106 to perform various tasks via natural language-based conversations with digital assistant 106. As part of a conversation, a user may provide one or more user inputs 110 and get responses 112 back from digital assistant 106. Via these conversations, a user can request one or more tasks to be performed by the digital assistant and, in response, the digital assistant may perform the user-requested tasks and respond with appropriate responses to the user.

User inputs 110 may be in a natural language and may be referred to as utterances. A user utterance can be in text form (e.g., when the user types something as input to digital assistant 106) or in audio input or speech form (e.g., when the user says something as input to digital assistant 106). The utterances are typically in a language spoken by end user 108. When a user input is in speech form, the user input may be converted to text utterances in that particular language and the text utterances are then processed by digital assistant 106. Various speech-to-text processing techniques may be used to convert a speech or audio input to a text utterance, which is then processed by digital assistant 106.

A text utterance, input by the user or generated by converting speech input to text form, can be a text fragment, a sentence, multiple sentences, and the like. Digital assistant 106 is configured to apply natural language understanding (NLU) techniques to the text utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents.

For example, the user input may request a pizza to be ordered, for example, "I want to order a pizza." Digital assistant 106 is configured to understand the meaning of the utterance and take appropriate actions that may involve responding to the end user with questions requesting user input on the type of pizza the end user desires to order, the size of the pizza, any toppings for the pizza, and the like. The responses provided by digital assistant 106 may also be in the form of natural language, which may involve natural language generation (NLG) processing performed by digital assistant 106. Once digital assistant 106 has the requisite information from the user, digital assistant 106 may then cause a pizza to be ordered. Digital assistant 106 may end the conversation with the end user by outputting information indicating that the pizza has been ordered.

In certain embodiments, an utterance received as input by digital assistant 106 goes through a series or pipeline of processing steps. These steps may include, for example, parsing the utterance, understanding the meaning of the utterance, refining and reforming the utterance to develop a better understandable structure for the utterance, determining an action to be performed in response to the utterance, causing the action to be performed, generating a response to be output to the end user responsive to the user utterance, outputting the response to the end user, and the like.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphora's, performing chunking, etc.). In certain embodiments, the NLU processing or portions thereof may be performed by digital assistant 106 itself. In some other embodiments, digital assistant 106 may use other resources to perform portions of the NLU processing. For example, the syntax and structure of a sentence may be identified by processing the sentence using a parser, a part-of-speech tagger, and/or a named entity recognizer. In one implementation, for the English language, a parser, a part-of-speech tagger, and a named entity recognizer provided by the Stanford Natural Language Processing (NLP) Group is used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. In certain embodiments, digital assistant 106 provides subsystems (e.g., components implementing NLU functionality) that are configured for processing different languages. These subsystems may be implemented as pluggable units that can be called using service calls from an NLU core server. This makes the NLU processing flexible and extensible for each language, including allowing different orders of processing. A language pack may be provided for each respective language, where the language pack can register a list of subsystems that can be served from the NLU core server, and can also take advantage of the generic subsystems provided, if needed.

A digital assistant, such as digital assistant 106, can be made available to its end users through a variety of different channels, such as, but not limited to, via certain applications (also referred to as apps), via social media platforms, via various messaging services and applications, and other applications or channels. A single digital assistant can have several channels configured for it so that it can be run on and accessed by different services simultaneously.

A digital assistant contains or is associated with one or more skills. In certain embodiments, these skills are individual chatbots that are designed to interact with end users and fulfill specific types of tasks, such as tracking inventory, submitting timecards, creating expense reports, ordering food, checking a bank account, making reservations, buying a widget, and the like. For example, for the embodiment depicted in FIG. 1, digital assistant 106 includes skill bots 116-1, 116-2, 116-3, and so on. As described above, the terms "skill" and "skills" are used synonymously with the terms "skill bot" and "skill bots," respectively, in this disclosure.

Each skill bot associated with a digital assistant helps an end user of the digital assistant complete a task through a conversation with the end user, where the conversation can include a combination of text or audio inputs provided by the end user and responses provided by the skill bot. These responses may be in the form of text or audio messages to the end user and/or using simple user interface elements (e.g., select lists) that are presented to the end user for the end user to make selections.

There are various ways in which a skill or skill bot can be added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as the "skills store") that offers multiple skills directed to a wide range of tasks. The skills offered through the skills store may expose various cloud services. A user of DABP 102 can access the skills store via DABP 102, select a desired skill, and add the selected skill to a digital assistant created using DABP 102. A skill from the skills store can be added to a digital assistant as is or in a modified form. For example, a user of DABP 102 may select and clone a particular skill bot provided by the skills store, make customizations or modifications to the selected skill bot, and then add the modified skill bot to a digital assistant created using DABP 102.

In certain embodiments, a digital assistant created and deployed using DABP 102 is implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, 116-3, and the like that are child bots of master bot 114. In certain embodiments, digital assistant 106 itself acts as the master bot.

A digital assistant implemented according to the master-child bot architecture enables end users of the digital assistant to interact with multiple skills through a unified user interface. When an end user engages with a digital assistant, the user input is received by the master bot, which then processes the user input to identify a user request. Based upon the processing, the master bot determines whether the user request can be handled by the master bot itself. If it is determined that the user request may not be handled by the master bot, the master bot selects an appropriate skill bot for handling the user request and routes the conversation to the selected skill bot. This enables an end user to, through a common single interface, converse with and use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, and the like. In this way, the end user or consumer of the digital assistant need only know how to access the digital assistant.

In a master bot/child bots infrastructure, the master bot is configured to be aware of the list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to identify or predict a specific skill bot, from the multiple available skill bots, that can best serve or handle the user request. The master bot then routes the utterance (or a portion of the utterance) to that specific skill bot for further handling. Control thus flows from the master bot to the skill bot. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or through a combination of software and hardware.

DABP 102 provides an infrastructure and various services and features that enable a use of DABP 102 to create a digital assistant including one or more skill bots associated with the digital assistant. For example, a skill bot can be created by cloning an existing skill bot, cloning an existing skill bot and then making modifications to the skill bot, or can be created from scratch using tools and services offered by DABP 102. In certain embodiments, DABP 102 provides a skills store or skills catalog offering multiple skill bots for performing various tasks. A user of DABP 102 can clone a skill bot from the skills store and create a new skill bot.

DABP 102 also enables a user (e.g., a skill bot designer) to create a skill bot from scratch. In certain embodiments, at a high level, creating a skill bot involves the following operations:

(1) Configuring settings for a new skill bot;
(2) Configuring one or more intents for the skill bot;
(3) Configuring entities for one or more intents;
(4) Training the skill bot;
(5) Creating a dialog flow for the skill bot;
(6) Adding custom components to the skill bot; and
(7) Testing and deploying the skill bot.

(1) Configuring settings for a new skill bot—A skill bot designer can specify one or more invocation names for the skill bot being created. These invocation names can be used in utterances to explicitly identify and invoke the skill bot in the digital assistant. The skill bot designer may also specify example utterances for the skill bot. These example utterances are representative of utterances for the skill bot. When user inputs are received, the intent analysis engine of the digital assistant compares the user inputs to these example utterances to determine if the particular skill bot is to be invoked.

(2) Configuring one or more intents for the skill bot—The skill bot designer may configure one or more intents (also referred to as bot intents) for the skill bot being created. These intents identify tasks that the skill bot can perform for end users of the digital assistant. Each intent is given a name. For example, for a skill bot configured to help users perform various banking transactions, intents may be specified by the skill bot designer for the skill bot, such as "Check Balance," "Transfer Money," "Deposit Check," and the like. For each intent, the skill bot designer specifies a set of example utterances that are representative of and illustrate the meaning of the intent and are typically associated with the task performed by that intent. For example, for the "Check Balance" intent, example utterances may include "What's my savings account balance?", "How much is in my checking account?", "How much money do I have in my account," and the like. Permutations of typical user requests and statements may also be specified as example utterances for an intent.

(3) Configuring entities for one or more intents of the skill bot—In some instances, additional context may be needed to enable the skill bot to properly respond to a user request. For example, there may be situations where two or more user input utterances resolve to the same intent in a skill bot. For instance, in the above example, utterances "What's my savings account balance?" and "How much is in my checking account?" both resolve to the same "Check Balance" intent, but these utterances are different requests asking for different things. To clarify such requests, one or more entities are added to an intent. Using the banking skill example, an entity called "Account Type," which defines values called "checking" and "saving," may enable the skill bot to parse the user request and respond appropriately. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an "Account Type" entity may be defined by the skill bot designer to enable various banking transactions by checking the user input for keywords like "checking," "savings," "credit cards," and the like.

(4) Training the skill bot—A skill bot is configured to receive user input, parse or otherwise process the received user input, and identify or select an intent that is relevant to the received user input. In order for this to happen, the skill bot may be trained. In certain embodiments, a skill bot is trained based upon the intents configured for the skill bot and the example utterances associated with the intents (collectively, the training data), so that the skill bot can resolve user input to one of its configured intents. In certain embodiments, a skill bot is represented by a model that is trained using the training data and allows the skill bot to discern what end users say (or in some cases, are trying to say). DABP 102 provides various different training techniques that can be used by a skill bot designer to train a skill bot, including various machine-learning-based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the skill bot can then be used to handle and respond to user utterances. In certain cases, a user's utterance may be a question that requires only a single answer and no further conversation. In order to handle such situations, a Q&A (question-and-answer) intent may be configured for a skill bot. This enables a skill bot to output replies to user requests without having to update the dialog definition. Q&A intents are created in a similar manner as regular intents. The dialog flow for Q&A intents is however different from regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take (e.g., how the skill bot responds to user utterances, how the skill bot prompts users for input, how the skill bot returns data, etc.). The dialog flow is like a flowchart followed by the skill bot. The skill bot designer specifies a dialog flow using a language, such as a markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the end users that the skill bot services.

In certain embodiments, the dialog flow definition contains three sections:

(a) a context section;
(b) a default transitions section; and
(c) a state's section Context section—The skill bot designer can define variables that are used in a conversation flow in the context section. Other variables that may be named in the context section include, without limitation, variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transitions section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when it is desired to provide end users with the option to temporarily leave a first skill they are engaged with to do something in a second skill within the digital assistant. In one example, if an end user is engaged in a conversation with a shopping skill (e.g., the user has made some selections for purchase), the end user may want to jump to a banking skill (e.g., the end user may want to ensure that he/she has enough money for the purchase), and then return to the shopping skill to complete the end user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed for the states. Components enable a skill bot to perform the functions. In certain embodiments, DABP 102 provides a set of pre-configured components for performing a wide range of functions. A skill bot designer can select one of more of these pre-configured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit, which applies when the end user signals the desire to exit the current conversation or context in the digital assistant; (2) Help, which applies when the end user asks for help or orientation; and (3) Unresolved Intent, which applies to user input that does not match well with the Exit and Help intents. The digital assistant also stores information about the one or more skill bots associated with the digital assistant.

At the master bot or digital assistant level, when an end user inputs a phrase or utterance to the digital assistant, the digital assistant is configured to perform processing to determine how to route the conversation. The digital assistant determines this using a routing model, which can be rules-based, artificial intelligence-based, or a combination thereof. The digital assistant uses the routing model to determine whether the conversation corresponding to the user input is to be routed to a particular skill for handling, is to be handled by the digital assistant or master bot itself based on a built-in system intent, or is to be handled as a different state in a current conversation flow.

In certain embodiments, as part of this processing, the digital assistant determines if the user input identifies a skill bot using its invocation name. An invocation name present in the user input may be treated as an explicit invocation of the skill bot corresponding to the invocation name. In such a scenario, the digital assistant may route the user input to the explicitly invoked skill bot for further handling. If there is no specific invocation, in certain embodiments, the digital assistant evaluates the received user input and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a confidence threshold routing parameter) is selected as a candidate for further evaluation. The digital assistant then selects, from the identified candidates, a particular system intent or a skill bot for further handling of the user input. In certain embodiments, after one or more skill bots are identified as candidates, the intents associated with those candidate skills are evaluated (according to the intent model for each skill) and confidence scores are applied to each intent. In general, any intent that has a confidence score exceeding a threshold value is treated as a candidate flow. If a particular skill bot is selected, then the user input is routed to that skill bot for further processing. If a system intent is selected, then one or more actions are performed according to the selected system intent.

As described above, a skill (also referred to as a bot, a chatbot, chatterbot, skill bot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to learn a programming language and download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other types of communication between two systems.

End users may interact with the bot system through a conversational interaction (sometimes referred to as a conversational user interface (UI)), just like interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another. The interaction may also be an informational interaction with, for example, a human resource (HR) bot, such as checking for vacation balance. The interaction may be an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input, the bot may determine the end user's intent in order to determine the appropriate next action to take.

An intent may include a goal that the end user would like to accomplish. An intent maps an end user input to actions that a backend system could perform for the end user. Therefore, based on the phrases uttered by the end user in a natural language, the bot may map the end user utterance to a specific use case or job, such as ordering pizza, getting account balance, transferring money, making a purchase, making a return, and the like. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At a certain time point, the end user may decide to return to the original intent—paying the recipient. Thus, one task of the bot system is to dynamically determine end user intents from natural language utterances.

A bot may use a natural language processing (NLP) engine and/or a machine-learning model (e.g., an intent classifier) to map end user utterances to specific intents. For example, a machine-learning-based NLP engine may learn to understand and categorize the natural language conversations from the end users and extract necessary information from the conversations to be able to take precise actions, such as performing a transaction or looking up data from a backend system of record.

Figure 2:
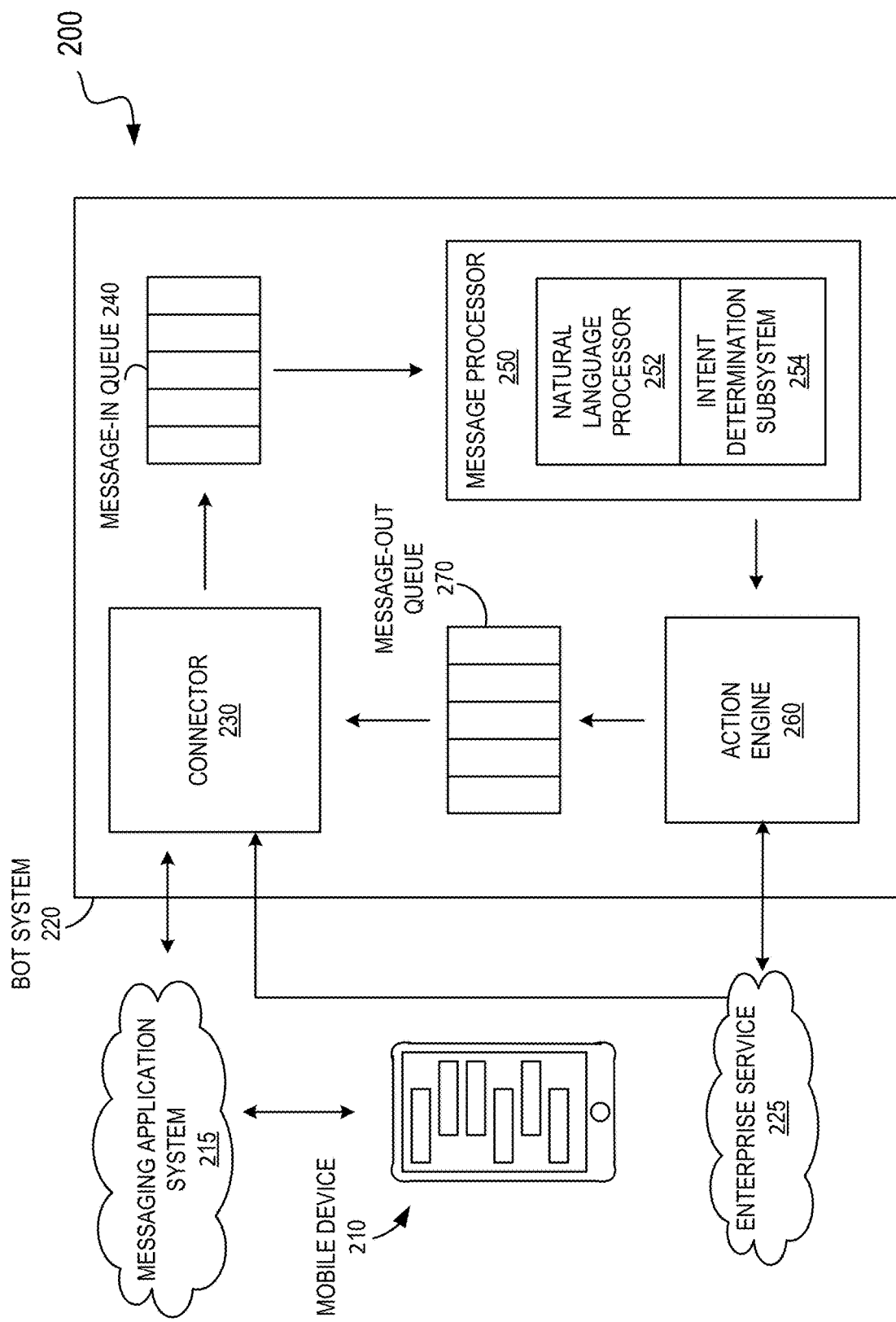
FIG. 2 depicts a distributed system that implements a bot system for communicating with end users using one or more messaging applications according to various embodiments.

FIG. 2 depicts a distributed system 200 that implements a bot system for communicating with an end user using a messaging application according to certain embodiments. System 200 may include a bot system 220, one or more messaging application systems 215, and one or more end user devices, such as one or more mobile devices 210. In some examples, the messaging application may be installed on an electronic device (e.g., a desktop computer, a laptop, mobile device 210, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 210. In some embodiments, two or more messaging applications may be installed on an end user device for communicating through two or more messaging platforms (such as two or more messaging application systems 215).

The messaging application may be facilitated by a messaging platform, such as messaging application system 215. Mobile device 210 may be connected to messaging application system 215 by a first network (e.g., the Internet). Messaging application system 215 may be a messaging platform provided by a third party, such as Facebook, Tencent, Google, Microsoft, etc. Messaging application system 215 may manage content sent and received through the messaging application across multiple mobile devices or other end user devices.

A bot system 220 (e.g., implemented on one or more servers) may also be communicatively connected to messaging application system 215 to send and receive massages. The communication between messaging application system 215 and bot system 220 may be through a second network (e.g., the Internet). The first network and the second network may be the same network, or they may be similar or completely different networks. Messaging application system 215 may route content (e.g., a message or information from a message) from mobile device 210 to bot system 220 using the Internet. In some embodiments, the destination of the content (e.g., an identification of bot system 220) may be included in the content as a nominal addressee. In some embodiments, bot system 220 may also be configured to communicate with two or more messaging application systems 215.

As discussed above, the content being exchanged between end users or between an end user and a bot system may include, for example, text, emojis, audio, media (e.g., a picture, a video, a link), or any other method of conveying a message. An example of a message received by bot system 220 from, for example, FACEBOOK® Messenger may include:
{
  "channel": {
    "tenant_id": "DemoTenant",
    "client_data": {
      "channel_user_id": "1103645260000000",
      "type": "facebook",
      "chat_id": "1103645260000000"
    },

```
    "type": "facebook",
    "bot_id": "DemoBot",
    "client_id": "facebook"
},
"id": "411fc848-350b-47de-89c3-a0ecee314401",
"text": "May I have a cheese pizza?",
"type": "text"
}
```

Bot system 220 may receive the content from messaging application system 215 using a connector 230 that acts as an interface between messaging application system 215 and bot system 220. In some embodiments, connector 230 may normalize content from messaging application system 215 such that bot system 220 may analyze content across different messaging application systems. The content normalization processing may include formatting content from each type of messaging application to a common format for processing. In some embodiments, bot system 220 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 230 may route the content to a message-in queue 240. Message-in queue 240 may include a buffer (e.g., a first-in first-out (FIFO) buffer) that stores content in the order received. In some embodiments, each connector 230 may be associated with one or more message-in queues.

Message-in queue 240 may send the content to a message processor 250 when message processor 250 becomes available. In some embodiments, message processor 250 may pull the content from message-in queue 240. Message processor 250 may parse a message and determine an intent of the parsed message as described in detail below. In some embodiments, message processor 250 may include a natural language processor 252 and an intent determination subsystem 254. Natural language processor 252 may parse a message and perform certain semantic analysis, such as identifying a subject, a predicate (e.g., an action), and/or an object. Intent determination subsystem 254 may determine an end user intent based on the parsed message. As described above, the intent may include a purpose of the message. For example, a purpose of the message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 252 and/or intent determination subsystem 254.

After the end user intent is determined based on the content by message processor 250, the determined intent (and the parameters associated with the intent) may be sent to an action engine 260. Action engine 260 may be used to determine an action to perform based on the intent (and the parameters associated with the intent) and the current state (or context) of a state machine as described above. For example, action engine 260 may send certain outbound content to message-out queue 270 as the response and/or may send a command to or retrieve information from some enterprise services, such as enterprise service 225. Message-out queue 270 may send the outbound content to connector 230. Connector 230 may then send the outbound content to a messaging application system indicated by action engine 260, which may be the same as or different from messaging application system 215. Messaging application system 215 may then forward the outbound content to the messaging application on mobile device 210.

Bot system 220 may communicate with one or more enterprise services (e.g., enterprise service 225), one or more storage systems for storing and/or analyzing messages received by bot system 220, or a content system for providing content to bot system 220. Enterprise service 225 may communicate with one or more of connector 230, action engine 260, or any combination thereof. Enterprise service 225 may communicate with connector 230 in a manner similar to messaging application system 215. Enterprise service 225 may send content to connector 230 to be associated with one or more end users. Enterprise service 225 may also send content to connector 230 to cause bot system 220 to perform an action associated with an end user. Action engine 260 may communicate with enterprise service 225 to obtain information from enterprise service 225 and/or to instruct enterprise service 225 to take an action identified by action engine 260.

In some embodiments, bot system 220 may include one or more timers. A timer may cause action engine 260 to send content to an end user using connector 230 and messaging application system 215 after an amount of time has lapsed. In some embodiments, a timer may send content to bot system 220 similar to an end user or enterprise service 225. For example, the timer may send a message to bot system 220 to be analyzed as a message from an end user would be analyzed.

In one specific embodiment, an end user may send a message to bot system 220 using mobile device 210 through messaging application system 215. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based on a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 260 may send command to or retrieve information from some enterprise services 225. For example, when bot system 220 (more specifically, message processor 250) determines an intent to check balance, bot system 220 may determine which of several accounts (e.g., checking or savings account) to check the balance for. If the end user inputs "What's my balance in my savings account," bot system 220 may extract "savings" and send a command to a bank server to check the balance, and then send the received balance information to the end user through a message. If the end user initially only uttered "what's the balance in my account?", bot system 220 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 220 may store information associated with end users in a cache. The cache may write to a database to save the information after an outbound message is sent to the messaging application system from connector 230. In other embodiments, the cache may write to the data at different times (e.g., after a particular event, after each event, after an amount of time, or any other metric to determine when to write to the database).

Bot system 220 may allow each component to be scaled when slowdowns are identified. For example, if bot system 220 identifies that the number of messages that are arriving at connector 230 exceeds a threshold, an additional one or more connectors may be added to connector 230. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 220 may be run on a virtual machine. By running on a virtual machine, additional virtual machines may be initiated as desired.

As described above, building the bot system, such as the user intent classification engine that can determine the end user's intents based upon end user utterances, is a challenging task in part due to the subtleties and ambiguity of natural languages and the dimension of the input space (e.g., possible end user utterances) and the size of the output space (number of intents). As such, a new bot system may need to be monitored, debugged, and modified in order to improve the performance of the bot system and user experience with the bot system. In many cases, it may be difficult to more specifically identify the root causes of the lower than desired performance of the bot system and determine how to improve the bot system without using an analytics or optimization tools.

In some circumstances, a bot owner, developer, or administrator may want to monitor the operational status of a bot, and understand how the bot is being used and where end users abandoned the bot, in order to improve the bot. For example, the bot owner, developer, or administrator may want to know which bot conversations are successful and which ones are not, in order to identify and diagnose underperforming elements of the bot system.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as all conversations, different categories of conversation, and individual conversations. For example, the graphic user interface may display options to filter or select certain types of conversations or individual conversations, and display the selected information graphically, for example, by visualizing the paths of the conversations. The analytic system may also provide suggestions, options, or other information for improving the bot system.

Figure 3:
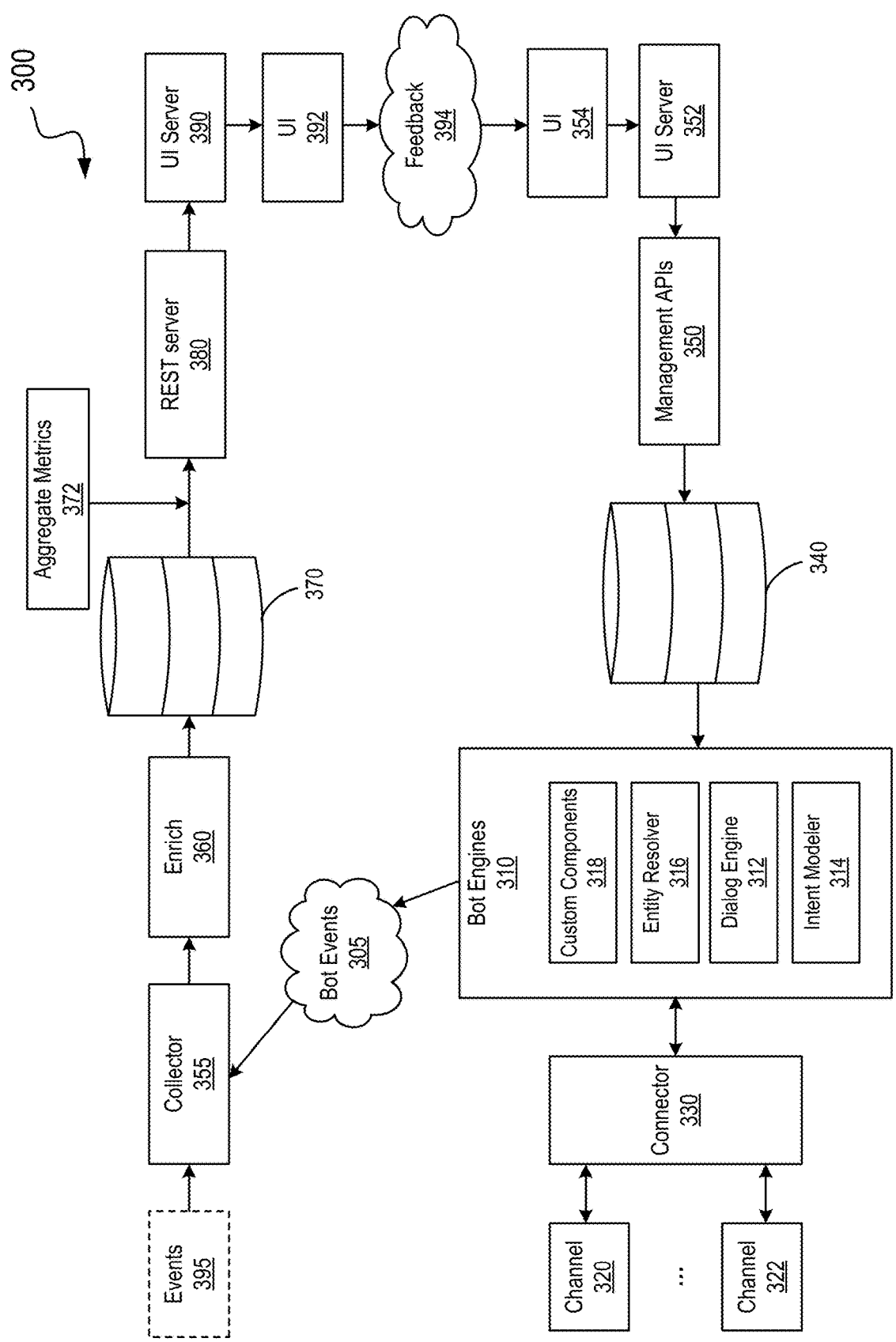
FIG. 3 depicts an integrated system including a bot system and a bot analytic system for monitoring, analyzing, visualizing, and improving the performance of a bot system according to various embodiments.

FIG. 3 depicts an integrated system 300 including a bot system (such as bot system 220) and a bot analytic system for monitoring, analyzing, visualizing, and improving the performance of the bot system according to certain embodiments. As illustrated, the bot system may include a connector 330 and a plurality of bot engines 310, such as a dialog engine 312, an intent modeler 314, an entity resolver 316, and custom components 318. The bot system may also include a database 340, management application programming interfaces (APIs) 350, a user interface 354, and a UI server 352. The bot analytic system may include a collector 355, an enrichment engine 360, a database 370, and a REST server 380. The bot analytic system may also include a user interface 392 and a UI server 390. Collector 355 of the bot analytic system may collect events 305 occurred at the bot system. Feedback 394 from the bot analytic system may be provided to the bot system through user interface 392 and user interface 354.

Connector 330 may act as an interface between the bot system and one or more end users through one or more channels, such as channels 320 and 322. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 130 may normalize content from different channels such that the bot system may analyze content across different messaging application systems. The content normalization processing may include formatting content from each type of messaging application to a common format for processing. In some embodiments, the bot system may include one or more connectors for each of the channels.

Intent modeler 314 may be used to determine end user intents associated with end user utterances. In some embodiments, intent modeler 314 for determining an intent of an end user based on one or more messages received by the bot system from the end user may use a natural language processor to tag the parts of speech (verb, noun, adjective), find lemmas/stems (runs/running/ran→run), and tag entities (Texas→LOCATION). In some embodiments, intent modeler 314 may normalize the message. For example, "Mary ran to Texas" may become "PERSON run to LOCATION." Intent modeler may also include logic to detect words which have the same meaning within an end user message. For example, if the training dataset includes: "Mary ran to Texas" and "Bob walked to Detroit," both mapped to the same intent, and run/walk appear in the same set of intents, intent modeler 314 may learn that for the purposes of intent resolution run=walk. In one illustrative example, "Mary ran to Texas" may become "PERSON run to LOCATION" and "Bob walked to Detroit" may become "PERSON walk to LOCATION." In the illustrated example, both sentences may be associated with a same intent because "noun run to noun" is the same as "noun walk to noun" for the purpose of intent resolution. In another example, "I want to order a large cheese pizza" and "I want to order a small pepperoni pizza" may both be normalized into "I want to order a Bots_PizzaSize Bots_Toppings pizza."

After normalization, a probability that the occurrence of a word may signify a certain intent may be determined. In some examples, probabilities can be combined using basic probability arithmetic as if they were independent. For example, if "order" suggests a 20% probability of ordering pizza, and "pizza" suggests a 10% probability of ordering pizza, the total probability would be $1-(1-0.2)(1-0.1)=$ 28%. Some probabilities may be based on presence of words, or based on certain language elements, like presence of negations or personal pronouns.

Another level of rule may be a template rule, which is a combination of words. In some examples, every sentence in a training dataset, once normalized, may automatically become a rule. In such examples, a training dataset may include a very small number of short sentences. The template rule may return a probability of 1. New rules may be generated from rules via a process of induction. For example, the following sentences may belong to track spending: "How much did I spend last month on gas?" and "How much did I spend in May on food?". The sentences may be used to induce the rule "How much did I spend" as that is the part which is shared between them. In other examples, the training dataset may include the phrase "How much did I spend" to achieve the same result.

Examples described above allow definitions of an intent to not include duplicates, such as variations on named entities (e.g., "Send money to Sue" and "Send money to Bob"). However, similar sentences where one or two words are different may be used for the training. Similar sentences may allow the model to learn which words may have the same meaning for intent resolution and which words may be common misspellings.

If a particular word or set of words (like the verb) is important to an intent, the probabilities may be manipulated by having more examples using such a word (and its synonyms) and fewer examples with such a word for other intents.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 316 may identify entities (e.g., objects) associated with the end user intents. For example, in addition to the end user intent identified by intent modeler 314, such as "order pizza," entity resolver 316 may resolve entities associated with the intent, such as the pizza type, toppings, and the like.

Dialog engine 312 may be used to handle the conversations between the end users and the bot system. For example, dialog engine 312 may respond to end user utterances based on the end user intent identified by intent modeler 314 and entities associated with the end user intent identified by entity resolver 316. In some embodiments, dialog engine 312 may use a state machine that includes user defined states (e.g., end user intents) and actions to take in the states or from state to state to handle the conversations with end users.

Custom components 318 may include customized modules for the specific bot system. For example, a financial bot may include custom components that may be used to, for example, check balance, transfer funds, or pay bills.

Database 340 may be used to store data for the bot system, such as data for the classification models, logs of conversation, and the like. Management APIs 350 may be used by an administrator or developer of the bot system to manage the bot system, such as retraining the classification models, editing intents, or otherwise modifying the bot system. The administrator or developer may use user interface 354 and UI server 352 to manage the bot system.

Various events may be generated while the bot system is running. The events may be generated based upon one or more instructions included in the bot system. For example, an event may be generated when the bot system has entered into a particular state, where the particular state is defined by an administrator or developer of the bot system. As events are generated, the events may be collected, stored, and analyzed by the bot analytic system. When capturing an event, additional information associated with the event may also be collected, where the additional information may indicate a present context in which the event is generated.

For example, conversation events may be generated by dialog engine 312. A conversation event may include a message received by a bot system from an end user device (referred to as msg_received). Msg_received may include one or more of the following parameters or variables: the content of the message, the time when the message is received by the bot system, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 312 may also generate dialog state execution events. As described above, dialog engine 312 may use a state machine to determine the flow of the conversations with end users. The state machine may include a set of states and rules of transition between the states. Dialog engine 312 may execute the state machine for each end user conversation, and a dialog state execution event may be produced for each state that dialog engine 312 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name may be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 314. Intent modeler 314 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 316 may generate entity resolver events. Entities are objects associated with end user intents. Entity definition rules may be determined when the bot system is created. For example, in addition to resolving end user intents, such as "order pizza," the bot system may also use entity resolver 316 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component may also generate events, such as a predefined event or a custom event. The predefined event may be a property captured at an execution of a custom component. Examples of attributes of the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system during execution. An error event may be generated when an error occurs. A timeout event may be generated when the end user conversation has been inactive for a period of time, which may be configured at the channel.

The bot analytic system may collect the events and additional information as the bot system conducts conversations with end users and generates the corresponding events. For example, collector 355 may collect the events and the additional information and send the collected information to a queue. In some embodiments, collector 355 may be configurable and can be programmed to collect different events and/or event attributes described above as desired. For example, collector 355 may be configured to capture dialog state attributes, intent resolution attributes, entity resolution attributes, and error and timeout attributes. In some embodiments, collector 355 may also be configured to collect information regarding events 395 generated by a system other than the bot system.

Enrichment engine 360 may perform validation and enrichment on the collected events and other information and write them to database 370. For example, based on a collected IP address, enrichment engine 360 may determine the location of the end user associated with the IP address. As another example, enrichment engine 360 may extract certain features from the collected information, such as determining a web browser or channel used by the end user. REST server 380 may analyze the enriched events and other information and generate various reports based on certain aggregate metrics 372. The reports may be displayed to an owner, administrator, or developer of the bot system on user interface 392 through UI server 390. The owner, administrator, or developer of the bot system may provide feedback 394 to the bot system for improving the bot system.

Figure 4:
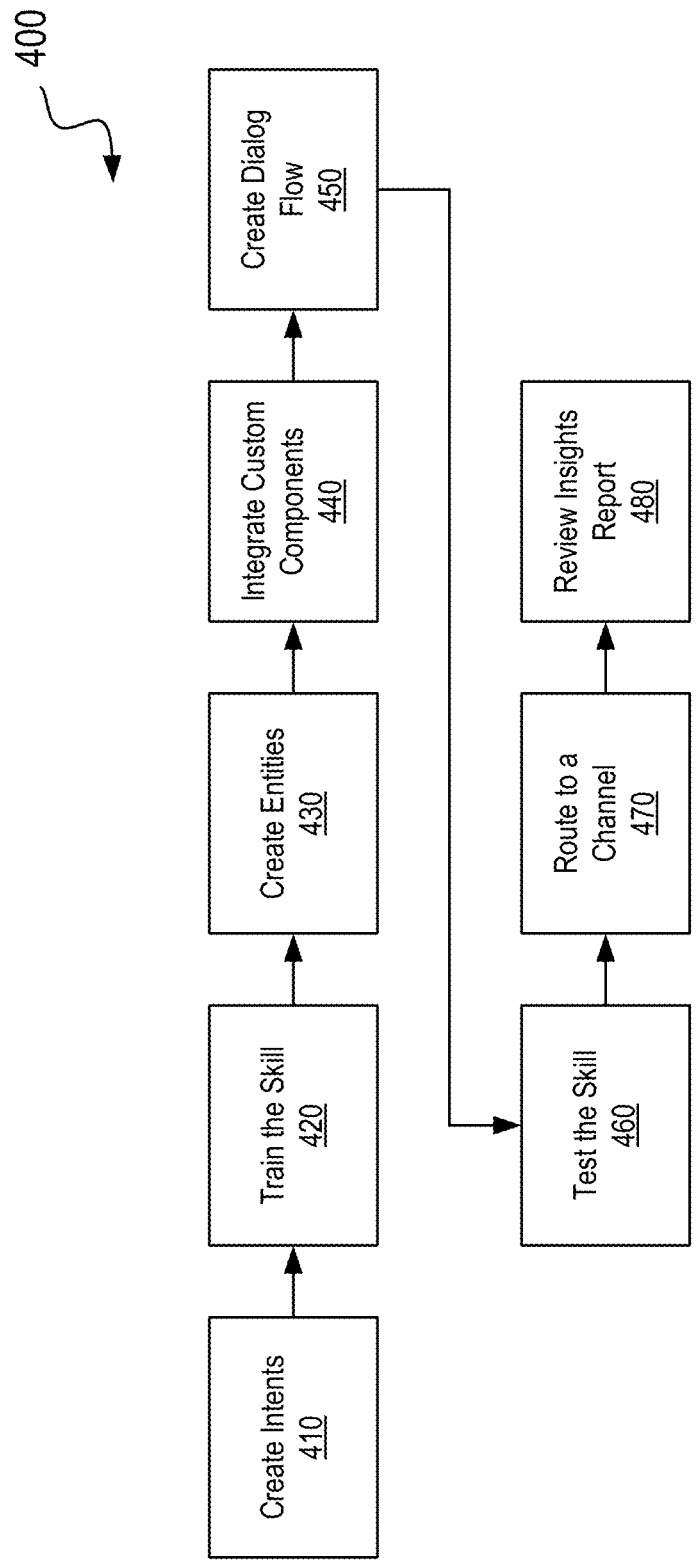
FIG. 4 is a simplified flowchart illustrating an example of a process for developing a bot according to various embodiments.

FIG. 4 is a simplified flowchart 400 illustrating an example of a process for developing a skill according to certain embodiments. The process may include creating intents at 410, training the skill at 420, creating entities as 430, integrating custom components at 440, creating dialog flow at 450, testing the skill at 460, routing to a channel at 470, and reviewing insights reports for improving the skill at 480.

At 410, intents for a skill may be created. Intents describes the various actions that a skill can help its end users to complete. For example, if the skill enables users to perform various banking transactions, the intents for the skill can include, for example, "Check Balance" or "Transfer Money." Intents not only describe what the skill can do, but may also be an integral part of the skill's intelligence. The intents enable the skill to recognize user input because each intent can have a set of typical user statements (i.e., utterances) associated with it. While these utterances may share the same meaning, they may be different (for example, "What's my savings account balance?" and "How much is in my checking account?").

At 420, the skill may be trained to infer user intents when it parses the user input. Specifically, the skill may be trained with the intents and their utterances (collectively, the training data), so that the skill can resolve the user input to one of the intents. The trained skill may not only recognize the sample phrases that belong to each intent, but also recognize similar phrases that correspond to each intent.

At 430, entities for the skill may be created. In some embodiments, the skill may need some additional context to complete a user request. While some user requests may be resolved to the same intent (e.g., "What's my savings account balance?" and "How much is in my checking account?" would both resolve to the "Check Balance" intent), they are asking for different things. To clarify the request, one or more entities may be added to an intent. Using the banking skill example, an entity "Account Type," which defines values such as "checking" and "saving," may enable the skill to parse the user request and respond appropriately.

At 440, custom components may be integrated into the skill. Before integrating components into the skill, the skill may recognize user input, but may not be able to respond to it. Components may enable the skill to perform is functions. The components may perform functions such as outputting text based on the intent that has been resolved from the end user's message, or perform tasks specific to a particular skill, such as checking an account balance.

At 450, a dialog flow may be created. The dialog flow describes how the skill reacts as different intents are resolved. The dialog flow defines operations or actions that a skill bot will take, such as how the skill bot responds to user utterances, how the skill bot prompts end users for input, how the skill bot returns data, and the like. In some embodiments, the dialog flow may be a flow chart that is described in a simple markdown language, such as a version of YAML (e.g., OBotML).

At 460, the skill may be tested after being developed and deployed in, for example, a digital assistant described above. The skill may be tested by having one or more conversations with the skill using one or more dialog flows.

Optionally, at 470, the skill may be routed to one or more channels for user messaging and other capabilities. For example, if the skill would not be added to a digital assistant, the skill can be added to one or more user messaging channels. Users can chat with the skill through one or more of these user messaging channels, such as various messaging platforms, proprietary messaging apps, and web pages. The skill would run on any of these channels, whether they are text-only or can support scrolling cards, UI elements, images, and other non-text content. In addition to user-interfacing channels, a skill may be routed to other channels, such as a channel that links the skill to a customer-support system or a channel that routes notifications from an external application that prompts the skill to initiate a conversation.

At 480, a developer may review the insight reports to improve the skill. For example, the developer can review the insight reports related to the skill to find out if the customers are using the skill as intended. The insight report may include, for example, high-level usage metrics and conversation trends, individual views of intents, their execution paths, and conversation transcripts. The insight reports may provide different perspectives on how well the skill supports its customers, and where it prevents them from completing a task. These insight reports may not only let the developer to spot problems quickly, but may also suggest user inputs that can improve the skill's intent resolution.

In some embodiments, different versions of a skill may be generated. In some embodiments, a skill may be a composite skill that includes two or more related skills to perform a more complex function as described above. For example, a composite skill A may include a skill B and a skill C, where, for example, outputs from skill B may be used as inputs to skill C.

As described above, a bot may use a machine-learning model (e.g., an intent classifier) to map end user utterances to specific intents. Despite widespread adoption, machine learning models, including neural network models, generally operate as black boxes that make inferences (outputs) by performing certain mathematical or logic operations on input data. The output of a machine learning model may include, for example, a prediction or classification, and/or the corresponding confidence level. However, the outputs of the model or a particular inference may not provide insights into the model, such that a user may understand the behavior of the model and the reasons behind the inferences. Thus, it may be difficult for a user to determine whether a model and/or a particular inference is trustworthy, such that the user can make a decision or take an action based on the inference or can choose to deploy the model. For example, when using machine learning for medical diagnosis or terrorism detection, predictions may not be acted upon on blind faith because the consequences may be catastrophic. There is also a need to evaluate the model as a whole before deploying it. Currently, models are generally evaluated using accuracy metrics or other statistics based on an available validation dataset. However, real-world data is often significantly different, and further, the evaluation metric may not be indicative of the product's goal.

In the case of a classifier for a bot system, a bot owner or developer may want to understand, for example, why the classifier infers a certain user intent from a particular user utterance, while infers a different user intent from a different user utterance, before deploying the classifier in the bot system. Gaining insights into the classifier may also help the bot developer to reduce the training data (e.g., training utterances) used for training the classifier, or more intelligently generate more useful training data to improve the classifier.

According to certain embodiments, a bot system may include an intent classifier and an inference explanation engine. The inference explanation engine may provide insights into the inferences of individual user utterances by the intent classifier. For example, the inference explanation engine may identify certain words or combinations of words that cause the intent classifier to make a certain inference with a certain confidence level from an utterance. The inference explanation engine may include, for example, a local surrogate model or a scoped rule model.

Surrogate models are trained to approximate the predictions of the underlying black box model. The purpose of the interpretable surrogate models is to approximate the predictions of the underlying model as accurately as possible using an interpretable surrogate model (e.g., a prediction function). A surrogate model may be obtained by: (1) selecting a dataset, which can be the same dataset or a subset of the same dataset that was used for training the underlying black box model or a new dataset from the same distribution; (2) for the selected dataset, generating the predictions using the underlying black box model; (3) selecting an interpretable model type (e.g., a linear model, decision tree, etc.); (4) training the interpretable model using the selected dataset and the predictions by the underlying black box model to generate a surrogate model; and (5) determining how well the surrogate model replicates the predictions of the underlying black box model, and retraining the surrogate model if necessary. The trained surrogate model may then be interpreted.

Instead of training a global surrogate model, local interpretable model-agnostic explanation (LIME) focuses on training local surrogate models to explain individual predictions. In LIME, the goal is to understand why the machine learning model makes a certain prediction. LIME generates a new dataset including variations (e.g., permuted samples) of an input sample and the corresponding predictions by the underlying machine learning model. An interpretable model is then trained using this new dataset. The interpretable model can be, for example, a least absolute shrinkage and selection operator (Lasso) or a decision tree. The trained interpretable model may be a good approximation of the predictions of the underlying machine learning model for variations of the input sample (local fidelity), but does not need be a good global approximation for all input samples. A local surrogate model may be obtained by: (1) selecting a sample of interest for which an explanation for the prediction by an underlying machine learning model may be needed; (2) perturbing the sample of interest and generating the predictions for the perturbed samples by the underlying machine learning model; (3) weighing the perturbed samples according to their proximity to the sample of interest; and (4) training a weighted, interpretable model using the perturbed samples and the corresponding predictions by the underlying machine learning model. The prediction of the sample of interest by the underlying machine learning model may then be explained by interpreting the trained interpretable model.

An example of a scoped rule model is anchor techniques. Anchor techniques can explain individual predictions of a black-box machine learning model (e.g., classifier) by finding a decision rule that "anchors" the prediction sufficiently. A rule anchors a prediction if changes in other feature values do not affect the prediction. One example anchor technique may utilize reinforcement learning techniques in combination with a graph search algorithm to reduce the number of model calls (and hence the run time) to a minimum while still being able to recover from a local optima. The anchor technique deploys a perturbation-based strategy to generate local explanations for predictions of black-box machine learning models. Instead of using surrogate models, the resulting explanations in the anchor technique are expressed as easy-to-understand IF-THEN rules. The rules are scoped and are reusable. For example, an anchor may include the notion of coverage that specifies other, possibly unseen, instances to which the rule may apply.

Finding anchors may involve solving an exploration or multi-armed bandit (MAB) problem, which originates in the discipline of reinforcement learning. To find anchors, neighbors or perturbations may be created and evaluated for an instance to be explained in one or more rounds. In each round, perturbations that match a currently observed rule (e.g., anchor) may be created and evaluated by calling the model. MABs may be used to efficiently explore and exploit different strategies (called arms in an analogy to slot machines) using sequential selection. In a given setting, each candidate rule is to be seen as an arm that can be pulled. Each time the candidate rule is pulled, respective neighbors are evaluated, and thus more information about the candidate rule's payoff (e.g., precision that indicates how well the rule describes the instance to be explained) may be obtained. When there is no statistical confidence that the candidate rule's payoff exceeds a certain threshold, more samples may be used. In each subsequent round, the best candidates of the previous round may be extended by additional feature predicates that are not yet contained therein.

The above processes may be combined in a beam search process, which is a graph search algorithm and a variant of the breadth-first algorithm. The beam search process carries the B best candidate rules of each round over to the next one (where B is the Beam Width). These B best candidate rules are then used to create new rules. The beam search process may include at most feature count (x) rounds, as each feature may be included in a rule at most once. In every round i, the beam search process generates candidates with i predicates and selects the B best candidate rules thereof. Therefore, by setting B higher, the algorithm may more likely to avoid local optima, but may use a high number of model calls and thus may increase the computational load.

Techniques for Explaining an Inference Result

In some embodiments, a client-facing service for clients hosting chatbots implements techniques for explaining an inference result, as described herein. The techniques described provide utility to the clients (e.g., entities hosting/owning chatbots) by enabling the client to review chatbot operations and results of those operations using comprehensive explanations. The opens the "black box" of the ML classifications to be viewed by the customer in order to review and improve chatbot systems. In some embodiments, the techniques are performed as part of a client-facing system and interface through which a client may review various aspects of the chatbots the client hosts. For example, a client may review, through an interface, a listing of the chatbots that the client hosts and various reports and suggestions related to the function of those chatbots.

The chatbot listings in the interface may further include information related to various interactions associated with various chatbots over a period of time. For example, the client may view various interactions including utterances that the chatbot has received over a period of time. The various interactions including utterances may have been associated with a particular inference result or a lack of inference result as predicted by the chatbot. An inference result is a result of interpreting, by a chatbot, a particular utterance. For example, an inherence result may include, without limitation, a classification result of an utterance by a chatbot (e.g., a prediction of an intent/service corresponding to the utterance), a confidence threshold of a classification determination (e.g. a threshold level of confidence that is required for a particular intent/service to be predictively associated with an utterance), etc. A client derives great value and utility from understanding how an inference result is generated with respect to a particular utterance.

Figure 5:
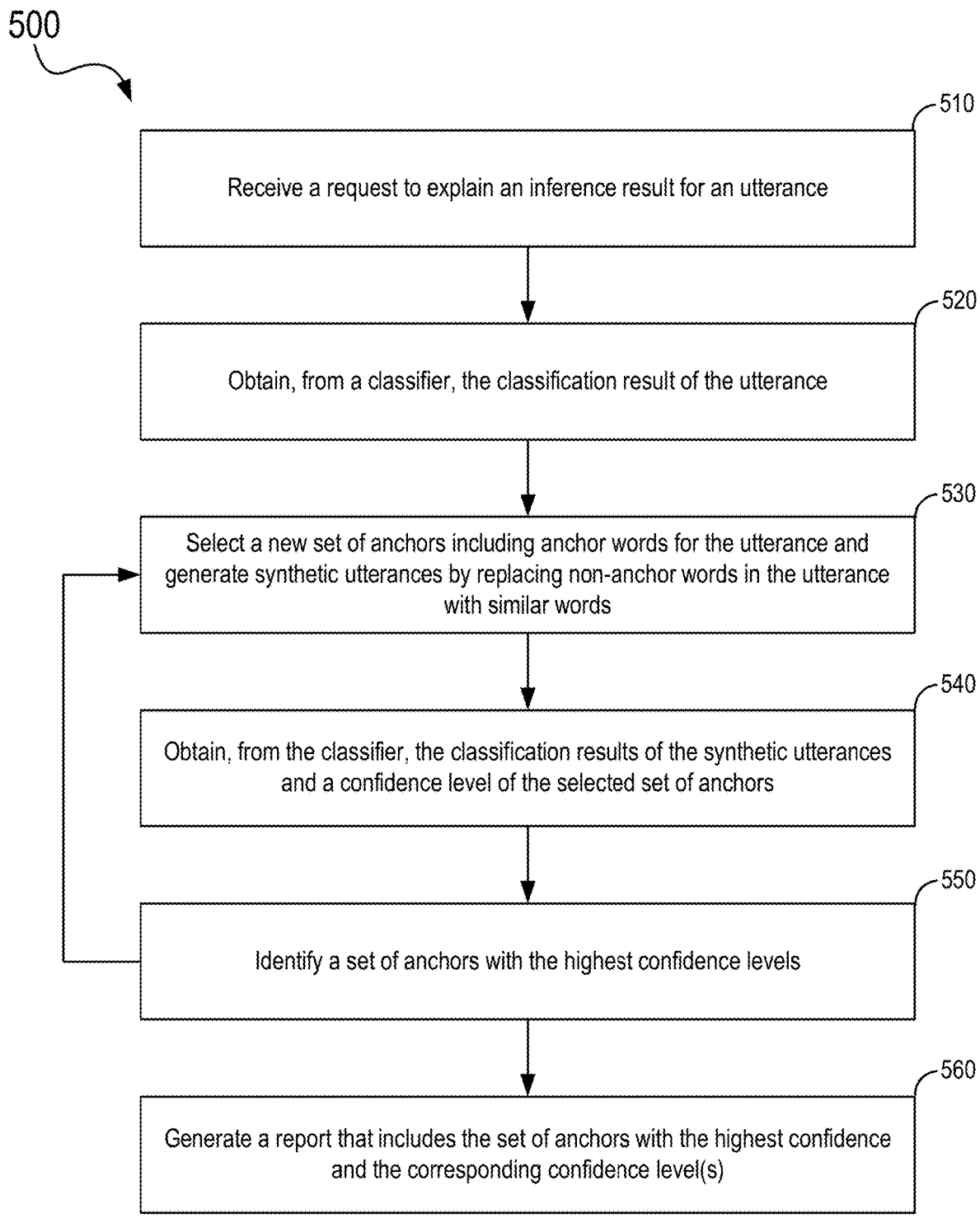
FIG. 5 is a simplified flowchart illustrating an example of a process for explaining an inference result according to various embodiments.

FIG. 5 is a simplified flowchart 500 illustrating an example of a process for explaining an inference result according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 5 may be performed by a pre-processing subsystem to explain an inference result according to certain embodiments. The machine learning model may include, for example, a neural network model, or any other machine learning models, and may be used as, for example, a classifier that classifies user intents based on user utterances.

At 510, a request to explain an inference result for an utterance is received. Specifically, the request is received from an entity to obtain a report relating to an inference result generated as a result of the chatbot parsing the utterance. For example, a client hosting a chatbot may generate and send a request, which is received as part of process 500, to generate a report for the client's review detailing an inherence result that was output by the chatbot at some previous time when the utterance was input.

As described herein, an inference result is a result or prediction including some data related to how a chatbot application parses and interprets an utterance. In some embodiments, the request to explain an inference result is received from an entity, such as a client hosting a chatbot application that derived the inference result for the utterance. For example, a chatbot may receive an utterance from a customer of the client and responsively cause some action to occur based on the customer's utterance. The request may be submitted, for example, though a command line or a user interface accessible by the client The process of causing the action will generate inference data that is useful to explain the manner in which the chatbot application caused the action given the utterance from the customer. The inference result may contain, for example, a classification result ascribed to the utterance based on the processing of the utterance by the chatbot application, which is useful to the client to understand how the chatbot application is functioning.

In some embodiments, the chatbot application hosted by the client includes a classifier that classifies user intents based on user utterances. For example, the classifier may be a subsystem of a chatbot system including a machine-learning model trained to take, as input, an utterance and output a predicted classification of the utterance. In some embodiments, the classifier is a trained neural network machine-learning model configured to map inputs included in the utterance to various nodes of a neural network model. The various nodes of the neural network model may then be process to cause an output result corresponding to a classification of the utterance. The classification may be, for example, an intent/service to which the chatbot predicts the utterance will correspond. In some embodiments, a classification result of the inference result described above is generated by the classifier.

In some embodiments, a system stores, in a computer memory, data relating to inherence results and classification made by a chatbot system in real time. For example, when a chatbot receives an utterance, the system may store the utterance received. After the chatbot outputs prediction data, for example relating to the predicted intent, the system may store the prediction data as part of the inference result. The client may review this information stored at the system to determine the utterances received and resulting inherent results generated by the chatbot. When the client determines that a problem has occurred with the chatbot, or is otherwise unsatisfied with the functions of the chatbot, the client may request a report explaining the inference result for the utterance. In some embodiments, the system storing data relating to the utterance and inference results is the same system that performed process 500.

At 520, the classification result of the utterance is obtained from the classifier. Specifically, a classifier, such as the classifier of that chatbot system in 510 or a similar classifier may be utilized to replicate the classification result when the utterance is input to the chatbot. For example, once the utterance and the chatbot system specified by a client in a report request is known, the utterance may be input to the chatbot system or a similar system to obtain the classification result as output (e.g., an intent that is predicted to correspond to the utterance).

In some embodiments, the classification result is obtained by inputting the utterance to the classifier, for example into a machine-learning model included in the classifier. Obtaining the classification result will allow a system to determine the classification result as part of the inference result that is requested to be explained in step 510. The classification result may then be obtained as output to perform further steps of process 500. In some embodiments, the classification result is saved as part of a previous operation of a chatbot application utilizing the classifier. For example, when a customer of the client sends the utterance to a chatbot application, the classifier of the chatbot application may generate the classification result and store the classification result at a local or external system, such as a client database. The classification result may then be obtained from the database at 520.

In some embodiments, the classification result includes classification data corresponding to a predicted intent/service corresponding to the utterance as predicted by the chatbot. For example, the classification data may include data relating to the utterance, one or more predicted intents/ services for the utterance, and one or more confidence values corresponding to a degree of confidence that the one or more predicted intents/services correspond to the utterance. In some embodiments, the confidence values corresponding to a level of correspondence between nodes of a trained neural network machine-learning model as utilized by the classifier when parsing the utterance.

In some embodiments, the classifier is a facsimile classifier that mimics the operation of a chatbot system. For example, a system may store the classifier as an individual classifier without a corresponding chatbot model. The system may use the classifier to obtain the classification result using the utterance without requiring an entire chatbot system to parse the utterance. The system may store, for example, a trained machine-learning model used by the chatbot system corresponding to the classifier, because only the classifier may be required to perform step 520. In some embodiments, the system that hosts the facsimile classifier is the same system that performs process 500.

Once the classification result is obtained, at 530, a new set of anchors including anchor words for the utterance is selected and synthetic utterances are generated by replacing non-anchor words in the utterance with similar words. Specifically, a subset of the words making up the utterance are grouped into a set of anchors, representing groupings of words of relative importance for generating the inference result. The words which are not in the set of anchors are replaced with similar words to form synthetic utterances. For example, one or more words in the utterance may be designated as anchor words, representing words that are predicted to be relatively more important to a classification than other words in the utterance. The words not designated as anchors are then replaced with similar words to form a new synthetic utterance that is semantically different than the original utterance, but contextually similar.

The result of the replacement of the non-anchor words will be the generation of synthetic utterances which retain some similarity to the original utterance due to the replacement of similar words. In some embodiments, selecting the one or more anchor words from the utterance includes determining one or more words included in the utterance corresponding to a high degree of uniqueness (e.g., there are fewer known synonyms of the word or phrase). In some embodiments, anchor words are words which are least likely to be replaceable in an utterance to form a similar utterance. For example, the utterance "I want to order a pizza." contains the words "I," "want," "to," "order," "a," and "pizza." In this phrase, the words "I" and "pizza" correspond to fewer alternative similar words than other words, and are likely candidates for anchor words. For example, the phrase "I desire to purchase one pizza." is a similar phrase to "I want to order a pizza." because the former is likely correspond to a similar intent as the latter. In contrast, the phrase "John wants to order a treehouse.," is not a similar phrase, despite the fact that the words "want(s)," "to," "order," and "a" are held as anchor words between the two phrases.

The selection of the new set of anchors may be made in any manner necessary to allow for generation of the synthetic utterances as described herein. In some embodiments, selecting the set of anchors includes using a beam sort algorithm to select potential candidates for anchor words in the utterance. For example, a process may determine one or more best candidates for anchor words based on some heuristic, such as the uniqueness metric described above. One or more additional words may then be selected to comprise the set of anchors. All words not selected for the set of anchors will be the non-anchor words that are replaced in the synthetic utterance with non-anchor words. In some embodiments, a set of anchors will only be selected if the set of anchors meets a heuristic threshold for anchor selection (e.g., an average uniqueness score of each word in a grouping must meet or exceed a threshold of uniqueness before it may be selected as a set of anchors.)

The steps of 530 allow for the generation of new synthetic utterances that are different than the original utterance but may be used for testing inference results for similarities and differences between the utterances after classification. By holding anchors as constants in these new utterances, the new utterances will reveal, at the word-level, how the particular inference result for the utterance is determined. For example, these new synthetic variations of the utterance may also be classified by the classifier to determine one or more predicted intents for the new utterances.

At 540, classification results of the synthetic utterances are obtained from the classifier as well as a confidence level for the selected set of anchors. Specifically, each synthetic utterance generated in 530 is input to the classifier model to obtain a result prediction of classification for the synthetic utterance. For example, for each synthetic utterance generated in 530, the synthetic utterance will be input to a ML model operating as part of the classifier utilized in 520 to obtain a classification result for the synthetic utterance. If the ML model is trained to output a predicted intent/skill given an input utterance, then the ML model will output one or more predicted intents/skills given the one or more synthetic utterances input to the ML model. Based on the predicted intents/skills for the synthetic utterances, a confidence value is be determined for the set of anchors selected in 530. The confidence value may correspond to any metric related to the generated synthetic utterances and the predicted intents/skills for those synthetic utterances. In some embodiments, the confidence value for a set of anchors is a percentage of generated synthetic utterances for which the classification result is the same as the classification result for the original. For example, if 100 synthetic utterances are generated for a set of anchors, and 87 of the 100 synthetic utterances are determined to correspond to a predicted intent that matches the predicted intent classification result obtained in 520, then the confidence value for the set of anchors may be 87%, or 0.87.

In some embodiments, each of the predicted classifications may correspond to a confidence metric associated with a level of confidence that a particular predicted intent/skill corresponds to an input utterance. For example, in some embodiments in which the ML model is a trained neural network ML model, the confidence metric may be based on a numerically-derived metric of correspondence between nodes of the trained neural network when processing the input utterance. In these embodiments, higher confidence metrics will correspond to relatively higher degrees of correspondence between the nodes of the trained neural network when the predicted intent/skill is output. In some embodiments, the confidence value of an associated set of anchors may be derived, in part, from the confidence metrics of each of the synthetic utterances generated for the associated set of anchors.

The classification results of the synthetic utterances are useful for determining the aspects of a chatbot utilized for predicting intents/skills based on an utterance. For example, the original utterance and a synthetic utterance may both be associated with the same predicted intent/skill. As a result, a reasonable inference can be made that the anchor words shared between the original utterance and the synthetic utterance are major factors in the inference result generated for the original utterance. In contrast, when the original utterance and a synthetic utterance do not share the same predicted intents/skills, a reasonable inference can be made that the anchor words shared between the original utterance and the synthetic utterance are either not major factors in the inference result, or the ML model is dysfunctional when processing certain words or phrases in an utterance. For these and similar reasons, the classification results of the generated synthetic utterances are highly valuable in determining inference results for an original utterance.

At 550, a set of anchors associated with a highest confidence level is identified. Specifically, a confidence value for a set of anchors corresponding to a highest confidence level may be selected for inclusion in a report to be responsively sent for the request received in 510. For example, process 500 may include generation of multiple sets of synthetic utterances based on multiple selected sets of anchors. Sets of anchors having the highest confidence value are most likely to be the most valuable when viewing a report regarding the inference results. Thus, at 550, the classification results and confidence level generated and obtained in 540 may be compared with confidence levels previously generated for other sets of anchors. The set of anchors and corresponding synthetic utterances having the highest confidence level(s) among the plurality of sets of anchors compared may be identified and saved for later inclusion in a report.

In some embodiments, a plurality of sets of anchors may be included in a report based on a threshold confidence level instead of selected the single highest confidence value among each set of anchors. For example, a threshold confidence value may be used a reporting cutoff for which sets of anchors will be or will not be included in a report. Each set of anchors and corresponding synthetic utterances will be included in a report if the confidence level of the set of anchors surpasses the threshold of confidence values.

Operations at 530-550 may be performed iteratively for multiple rounds, for example, in a beam search process described above, where different combinations of words may be used as anchors in each round. In one example, each word of the utterance may be used as the anchor word to generate variations of the utterance as synthetic utterances in the first round, the synthetic utterances may be classified by the classifier, and the anchors that have the confidence level may be selected after the first round. In some embodiments, in the second round, any combination of an anchor word selected in the first round and another word in the utterance may be used as the anchor words for an anchor to generate more variations of the as synthetic utterances; the synthetic utterances may be classified by the classifier; the classification results may be compared with the classification results of the original utterance, and the anchors that have the highest confidence level may be selected after the second round.

In some embodiments, in the second round, a new combination of anchor words not selected in the first round may be selected and used to generate synthetic utterances, which will then be classified and compared as described above. The iteration of operations 530-550 may stop when all anchors of significance have been selected and synthetic utterances have been generated for those anchors. For example, a uniqueness threshold may be employed as part of the beam search. Once all sets of anchors which satisfy the uniqueness threshold have been selected at 530, the iteration may stop at 550 and the process 500 may proceed to 560.

At 560, based on the results at 550 in the multiple rounds, a report may be generated. The report may include one or more sets of anchors and corresponding confidence levels of the sets of anchors. In some embodiments, the report may include the classification results for the synthetic utterances. Based on the report, a user may understand which word or combination of words causes the classifier to infer a particular intent from the original utterance. For example, the report may show the original utterance "I want to order a pizza." along with synthetic utterances, such as "I desire to purchase one pizza." The report may indicate, for example, that both the original and synthetic utterance were predicted to correspond to an similar intent, for example an intent named "ORDER FOOD," an at similar levels of confidence. The user may therefore infer, from the report, that shared anchor words "I" and "Pizza" are major factors in determining the same intent and are causes for a relatively higher confidence value for that particular set of anchors.

Table 1 below shows an explanation section of an example report in a JSON file. The report includes the inference result of the classifier for the original utterance "money available." The report also includes, for each anchor, variations of the original utterance generated using the anchor, the corresponding classification results by the classifier, and the respective precision determined based on the number of matches and the number of mismatches between the classification results of the variations of the original utterance and the classification result of the original utterance. For example, when the anchor only includes word "available," variations of the original utterance may include "#available," "amenities available," "bicycles available," "+available," "2017 available," and the like. The classifier may classify these utterances as associated with an intent "balances," which matches the classification result of the original utterance. However, the classifier may classify utterances "commercially available," "only available," "universally available," and "Currently available" as associated with an intent "unresolvedintent," which does not match the classification result of the original utterance. The report shows that the precision associated with anchor "available" is about 47.5%. When the anchor includes both word "money" and word "available," the precision is about 100%.

TABLE 1

Explanation section of an example report (in JSON)

{\rtf1\ansi\ansicpg1252\cocoartf1671\cocoasubrtf600
{\fonttbl\f0\fmodern\fcharset0 Courier;}
{\colortbl;\red255\green255\blue255;\red52\green62\blue66;\red255\green255\blue255;\red119\green105\blue65;
\red9\green74\blue76;}
{\*\expandedcolortbl;;\cssrgb\c26275\c30980\c32941;\cssrgb\c100000\c100000\c100000;\cssrgb\c54118\c48235\c32157;
\cssrgb\c0\c36078\c37255;}
\margl1440\margr1440\vieww10800\viewh8400\viewkind0
\deftab720

TABLE 1-continued

Explanation section of an example report (in JSON)

```
\pard\pardeftab720\s1280\partightenfactor0
\f0\fs24 \cf2 \cb3 \expnd0\expndtw0\kerning0
\outl0\strokewidth0 \strokec2 \{\cb1 \
\cb3      \cb1 "explain_beam_value"\cb3 : \cf4 \cb1 \strokec4 4\cf2 \cb3 \strokec2 , \cb1 \
\cb3      \cb1 "generated_queries"\cb3 : \cf4 \cb1 \strokec4 630\cf2 \cb3 \strokec2 , \cb1 \
\cb3      \cb1 "explain_without_confidence_threshold"\cb3 : \{\cb1 \
\cb3          \cb1 "explain_word_list_size"\cb3 : \cf5 \cb1 \strokec5 "2"\cf2 \cb3 \strokec2 , \cb1 \
\cb3          \cb1 "utterances_with_similar_predictions"\cb3 : \{\cb1 \
\cb3              \cb1 "money available"\cb3 : \{\cb1 \
\cb3                  \cb1 "Balances"\cb3 : \cf4 \cb1 \strokec4 1\cf2 \strokec2 \
\cb3              \}\cb1 \
\cb3          \},\cb1 \
\cb3          \cb1 "utterances_with_dissimilar_predictions"\cb3 : \{\},\cb1 \
\cb3          \cb1 "prediction_value"\cb3 : \cf4 \cb1 \strokec4 1\cf2 \cb3 \strokec2 , \cb1 \
\cb3          \cb1 "precision"\cb3 : \cf5 \cb1 \strokec5 "1.0"\cf2 \cb3 \strokec2 , \cb1 \
\cb3          \cb1 "prediction"\cb3 : \cf5 \cb1 \strokec5 "Balances"\cf2 \cb3 \strokec2 , \cb1 \
\cb3          \cb1 "explain_word_list"\cb3 : [\cb1 \
\cb3              \cf5 \cb1 \strokec5 "available"\cf2 \cb3 \strokec2 , \cb1 \
\cb3              \cf5 \cb1 \strokec5 "money"\cf2 \strokec2 \
\cb3          ],\cb1 \
\cb3          \cb1 "partial"\cb3 : \{\cb1 \
\cb3              \cb1 "money"\cb3 : \{\cb1 \
\cb3                  \cb1 "utterances_with_similar_predictions"\cb3 : \{\cb1 \
\cb3                      \cb1 "money available"\cb3 : \{\cb1 \
\cb3                          \cb1 "Balances"\cb3 : \cf4 \cb1 \strokec4 1\cf2 \strokec2 \
\cb3                      \}\cb1 \
\cb3                  \},\cb1 \
\cb3                  \cb1 "utterances_with_dissimilar_predictions"\cb3 : \{\},\cb1 \
\cb3                  \cb1 "precision"\cb3 : \cf5 \cb1 \strokec5 "1.0"\cf2 \cb3 \strokec2 , \cb1 \
\cb3                  \cb1 "explain_word_list"\cb3 : [\cb1 \
\cb3                      \cf5 \cb1 \strokec5 "available"\cf2 \cb3 \strokec2, \cb1 \
\cb3                      \cf5 \cb1 \strokec5 "money"\cf2 \strokec2 \
\cb3                  ]\cb1 \
\cb3              \},\cb1 \
\cb3              \cb1 "available"\cb3 : \{\cb1 \
\cb3                  \cb1 "utterances_with_similar_predictions"\cb3 : \{\cb1 \
\cb3                      \cb1 "# available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "\'87 available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "2017 available"\cb3 : \{\cb1 \
\cb3                          \cb1 "Balances"\cb3 : \cf4 \cb1 \strokec4 0.9768\cf2 \strokec2 \
\cb3                      \},\cb1 \
\cb3                      \cb1 "amenities available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "\'95 available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "bicycles available"\cb3 : \{\cb1 \
\cb3                          \cb1 "Balances"\cb3 : \cf4 \cb1 \strokec4 0.9957\cf2 \strokec2 \
\cb3                      \},\cb1 \
\cb3                      \cb1 "+ available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "^available"\cb3 : \{\cb1 \
\cb3                          \cb1 "Balances"\cb3 : \cf4 \cb1 \strokec4 1\cf2 \strokec2 \
\cb3                      \},\cb1 \
\cb3                      \cb1 "tracks available"\cb3 : \{\cb1 \
\cb3                          \cb1 "Balances"\cb3 : \cf4 \cb1 \strokec4 0.9982\cf2 \strokec2 \
\cb3                      \}\cb1 \
\cb3                  \},\cb1 \
\cb3                  \cb1 "utterances_with_dissimilar_predictions"\cb3 : \{\cb1 \
\cb3                      \cb1 "commercially available"\cb3 : \{\cb1 \
\cb3                          \cb1 "unresolvedIntent"\cb3 : \cf4 \cb1 \strokec4 0\cf2 \strokec2 \
\cb3                      \},\cb1 \
\cb3                      \cb1 "only available"\cb3 : \{\cb1 \
\cb3                          \cb1 "unresolvedIntent"\cb3 : \cf4 \cb1 \strokec4 0\cf2 \strokec2 \
\cb3                      \},\cb1 \
\cb3                      \cb1 "universally available"\cb3 : \{\cb1 \
\cb3                          \cb1 "unresolvedIntent"\cb3 : \cf4 \cb1 \strokec4 0\cf2 \strokec2 \
\cb3                      \},\cb1 \
\cb3                      \cb1 "Currently available"\cb3 : \{\cb1 \
\cb3                          \cb1 "unresolvedIntent"\cb3 : \cf4 \cb1 \strokec4 0\cf2 \strokec2 \
\cb3                      \},\cb 1 \
\cb3                      \cb1 "currently available"\cb3 : \{\cb1 \
```

TABLE 1-continued

| Explanation section of an example report (in JSON) |
|---|

```
\cb3                \cb1 "unresolvedIntent"\cb3 : \cf4 \cb1 \strokec4 0\cf2 \strokec2 \
\cb3              \}\cb1 \
\cb3            \cb1 "Most available"\cb3 : \{\cb1 \
\cb3                \cb1 "unresolvedIntent"\cb3 : \cf4 \cb1 \strokec4 0.5912\cf2 \strokec2 \
\cb3              \}\cb1 \
\cb3            \},\cb1 \
\cb3            \cb1 "precision"\cb3 : \cf5 \cb1 \strokec5 "0.47513812154696133"\cf2 \cb3
\strokec2 ,\cb1 \
\cb3            \cb1 "explain_word_list"\cb3 : [\cb1 \
\cb3                \cf5 \cb1 \strokec5 "available"\cf2 \strokec2 \
\cb3            ]\cb1 \
\cb3          \}\cb1 \
\cb3        \}\cb1 \
\cb3      \},\cb1 \
\cb3      \cb1 "queries_in_cache"\cb3 : \cf4 \cb1 \strokec4 255\cf2 \cb3 \strokec2 ,\cb1 \
\cb3      \cb1 "runtime"\cb3 : \cf4 \cb1 \strokec4 22.99283367395401\cf2 \cb3 \strokec2 ,\cb1 \
\cb3      \cb1 "explain_threshold"\cb3 : \cf4 \cb1 \strokec4 0.95\cf2 \cb3 \strokec2 , \cb1 \
\cb3      \cb1 "bots_threshold"\cb3 : \cf4 \cb1 \strokec4 0.7\cf2 \ch3 \strokec2 , \cb1 \
\cb3      \cb1 "explain_with_confidence_threshold"\cb3 : \{\cb1 \
\cb3        \cb1 "explain_word_list_size"\cb3 : \cf5 \cb1 \strokec5 "2"\cf2 \cb3 \strokec2 ,\cb1 \
\cb3        \cb1 "utterances_with_similar_predictions"\cb3 : \{\cb1 \
\cb3          \cb1 "money available"\cb3 : \{\cb1 \
\cb3            \cb1 "Balances"\cb3 : \cf4 \cb1 \strokec4 1\cf2 \strokec2 \
\cb3          \}\cb1 \
\cb3        \},\cb1 \
\cb3        \cb1 "utterances_with_dissimilar_predictions"\cb3 : \{\},\cb1 \
\cb3        \cb1 "prediction_value"\cb3 : \cf4 \cb1 \strokec4 1\cf2 \cb3 \strokec2 ,\cb1 \
\cb3        \cb1 "precision"\cb3 : \cf5 \cb1 \strokec5 "1.0"\cf2 \cb3 \strokec2 , \cb1 \
\cb3        \cb1 "prediction"\cb3 : \cf5 \cb1 \strokec5 "Balances"\cf2 \cb3 \strokec2 ,\cb1 \
\cb3        \cb1 "explain_word_list"\cb3 : [\cb1 \
\cb3            \cf5 \cb1 \strokec5 "available"\cf2 \cb3 \strokec2 , \cb1 \
\cb3            \cf5 \cb1 \strokec5 "money"\cf2 \strokec2 \
\cb3        ],\cb1 \
\cb3        \cb1 "partial"\cb3 : \{\cb1 \
\cb3          \cb1 "money"\cb3 : \{\cb1 \
\cb3            \cb1 "utterances_with_similar_predictions"\cb3 : \{\cb1 \
\cb3              \cb1 "money available"\cb3 : \{\cb1 \
\cb3                \cb1 "Balances"\cb3 : \cf4 \cb1 \strokec4 1\cf2 \strokec2 \
\cb3              \}\cb1 \
\cb3            \},\cb1 \
\cb3            \cb1 "utterances_with_dissimilar_predictions"\cb3 : \{\},\cb1 \
\cb3            \cb1 "precision"\cb3 : \cf5 \cb1 \strokec5 "1.0"\cf2 \cb3 \strokec2 ,\cb1 \
\cb3            \cb1 "explain_word_list"\cb3 : [\cb1 \
\cb3                \cf5 \cb1 \strokec5 "available"\cf2 \cb3 \strokec2 , \cb1 \
\cb3                \cf5 \cb1 \strokec5 "money"\cf2 \strokec2 \
\cb3            ]\cb1 \
\cb3          \},\cb1 \
\cb3          \cb1 "available"\cb3 : \{\cb1 \
\cb3            \cb1 "utterances_with_similar_predictions"\cb3 : \{\cb1 \
\cb3              \cb1 "positions available"\cb3 : \{\cb1 \
\cb3                \cb1 "Balances"\cb3 : \cf4 \cb1 \strokec4 0.9998\cf2 \strokec2 \
\cb3              \}\cb1 \
\cb3              \cb1 "worldwide available"\cb3 : \{\cb1 \
\cb3                \cb1 "Balances"\cb3 : \cf4 \cb1 \strokec4 0.9827\cf2 \strokec2 \
\cb3              \}\cb1 \
\cb3              \cb1 "specification available"\cb3 : \{\cb1 \
\cb3                \cb1 "Balances"\cb3 : \cf4 \cb1 \strokec4 1\cf2 \strokec2 \
\cb3              \}\cb1 \
\cb3              \cb1 "\'86 available"\cb3 : \{\cb1 \
\cb3                \cb1 "Balances"\cb3 : \cf4 \cb1 \strokec4 1\cf2 \strokec2 \
\cb3              \}\cb1 \
\cb3              \cb1 "Fuel available"\cb3 : \{\cb1 \
\cb3                \cb1 "Balances"\cb3 : \cf4 \cb1 \strokec4 0.9967\cf2 \strokec2 \
\cb3              \}\cb1 \
\cb3              \cb1 "\'87 available"\cb3 : \{\cb1 \
\cb3                \cb1 "Balances"\cb3 : \cf4 \cb1 \strokec4 1\cf2 \strokec2 \
\cb3              \}\cb1 \
\cb3              \cb1 "Phone available"\cb3 : \{\cb1 \
\cb3                \cb1 "Balances"\cb3 : \cf4 \cb1 \strokec4 0.9992\cf2 \strokec2 \
\cb3              \}\cb1 \
\cb3              \cb1 "^available"\cb3 : \{\cb1 \
\cb3                \cb1 "Balances"\cb3 : \cf4 \cb1 \strokec4 1\cf2 \strokec2 \
\cb3              \}\cb1 \
\cb3              \cb1 "editions available"\cb3 : \{\cb1 \
\cb3                \cb1 "Balances"\cb3 : \cf4 \cb1 \strokec4 1\cf2 \strokec2 \
\cb3              \}\cb1 \
\cb3            \},\cb1 \
\cb3            \cb1 "utterances_with_dissimilar_predictions"\cb3 : \{\cb1 \
```

TABLE 1-continued

Explanation section of an example report (in JSON)

```
\cb3             \cb1 "internationally available"\cb3 : \{\cb1 \
\cb3                  \cb1 "unresolvedIntent"\cb3 : \cf4 \cb1 \strokec4 0\cf2 \strokec2 \
\cb3             \},\cb1 \
\cb3             \cb1 "commercially available"\cb3 : \{\cb1 \
\cb3                  \cb1 "unresolvedIntent"\cb3 : \cf4 \cb1 \strokec4 0\cf2 \strokec2 \
\cb3             \},\cb1 \
\cb3             \cb1 "also available"\cb3 : \{\cb1 \
\cb3                  \cb1 "unresolvedIntent"\cb3 : \cf4 \cb1 \strokec4 0\cf2 \strokec2 \
\cb3             \},\cb1 \
\cb3             \cb1 "not available"\cb3 : \{\cb1 \
\cb3                  \cb1 "unresolvedIntent"\cb3 : \cf4 \cb1 \strokec4 0\cf2 \strokec2 \
\cb3             \},\cb1 \
\cb3             \cb1 "software available"\cb3 : \{\cb1 \
\cb3                  \cb1 "unresolvedIntent"\cb3 : \cf4 \cb1 \strokec4 0\cf2 \strokec2 \
\cb3             \},\cb1 \
\cb3             \cb1 "currently available"\cb3 : \{\cb1 \
\cb3                  \cb1 "unresolvedIntent"\cb3 : \cf4 \cb1 \strokec4 0\cf2 \strokec2 \
\cb3             \}\cb1 \
\cb3             \},\cb1 \
\cb3             \cb1 "precision"\cb3 : \cf5 \cb1 \strokec5 "0.5247524752475248"\cf2 \cb3 \strokec2
,\cb1 \
\cb3             \cb1 "explain_word_list"\cb3 : [\cb1 \
\cb3                  \cf5 \cb1 \strokec5 "available"\cf2 \strokec2 \
\cb3             ]\cb1 \
\cb3          \}\cb1 \
\cb3       \}\cb1 \
\cb3    \},\cb1 \
\cb3    \cb1 "utterance"\cb3 : \cf5 \cb1 \strokec5 "money available"\cf2 \cb3 \strokec2 , \cb1 \
\cb3    \cb1 "number_words"\cb3 : \cf4 \cb1 \strokec4 2\cf2 \strokec2 \
\cb3 \}}
```

Figure 6:
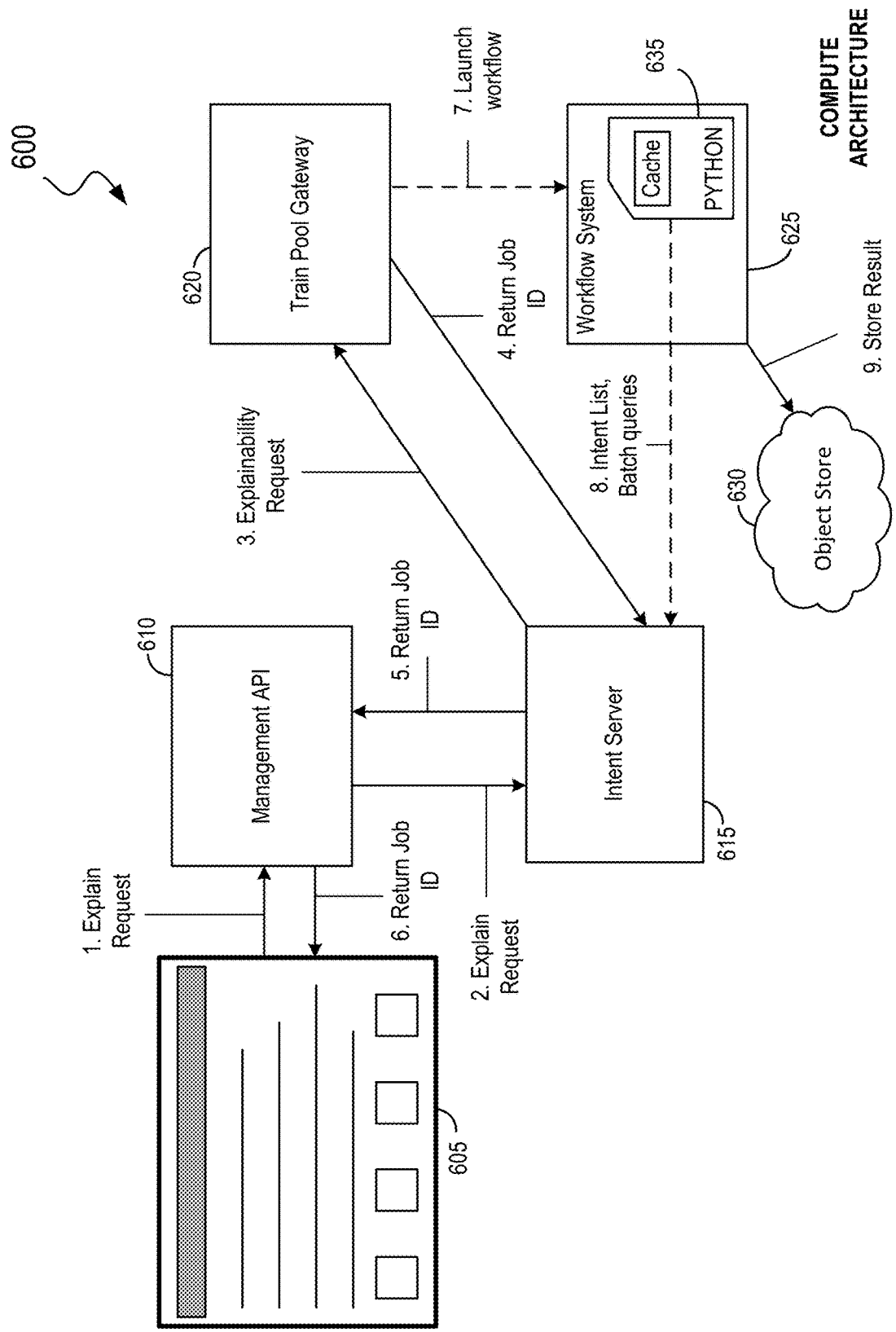
FIG. 6 illustrates an example of a system for providing explanations for text classifications according to various embodiments.

FIG. 6 illustrates an example of a system 600 for explaining an inference result according to certain embodiments. For example, system 600 may be a system for causing implementation of process 500 or similar processes as described herein. System 600 includes a user interface 605, a management API 610, an intent server 615, a gateway 620, a workflow engine 625 (e.g., a server), and a database or cloud storage device 630. Intent server 615 may include a classifier that infers user intents based on user utterances. Workflow engine 625 may execute an application 635 (e.g., in python code) to perform the classification explanation described above, for example, with respect to process 500 of FIG. 5.

A client may submit an explanation request with a classification query (e.g., an utterance) to the gateway 620 through a user interface 605 and the management API 610 using an asynchronous call. For example, a client may utilize a client device to interact with user interface 605 to view aspects of a chatbot or otherwise interact with a service associated with a chatbot. In some embodiments, the client may use system 600 to view utterances processed by the chatbot at some previous time, as well as inference results generated for that utterance. For example, a client may be using a particular chatbot as part of their own service.

The client may notice that a particular utterance was processed and an unexpected inference result was generated for the utterance (e.g., the utterance "I would like to order a pizza" was predicted to corresponding to a request to process a customer refund). The client may then request an explanation for an inference result based on the utterance, as described in 510. The client may enter this request at user interface 605, which will then route the request to management API 610. management API 610 may be an API operating as part of a chatbot explanation system separate from a client device utilized by the client.

In some embodiments, upon receipt of the asynchronous call by the management API 610, the management API 610 forwards the call to the intent server 615 for routing to the gateway 620. In other instances, upon receipt of the asynchronous call by the management API 610, the management API 610 forwards the call directly to the gateway 620. In the instance that the intent server 615 receives the call, the intent server 615 forwards the call to the gateway 620. The gateway 620 provides a job identifier for the explanation request, and the job identifier is returned to the user via the intent server 615, the management API 610, and user interface 605. The gateway 620 initiates workflow for processing the explanation request by forwarding the explanation request and associated job identifier to the workflow engine 625. The job identifier may be, for example, an identifier corresponding to a report generation process such as process 500.

Workflow engine 625 executes application 635 to perform classification explanation, for example, using the beam search technique discussed above. Application 635 may, in one or more rounds, generate new utterances (e.g., between about 500 and 2000 new utterances on average) that are variations of the original utterance (i.e., the classification query within the explanation request) using various anchors, and feed the new synthetic utterances to intent server 615. In some instances, the application 635 uses a cache to ensure only unique utterances are submitted to the intent server 615. For example, some synthetic utterances generated by application 635 may be known utterances previously received organically from a user of a chatbot system. Intent server 615 exposes APIs to obtain a list of intents and the new utterances from the workflow engine 625. The workflow engine 625 generates classification results for the new utterances based on the list of intents obtained. Application 635 may determine the confidence levels for the anchors based on the classification results in the previous round(s), select anchors that have the highest confidence level, determine new anchors based on the selected anchors, generate new queries based on the new anchors, and feed the new queries to intent server 615, in accordance with processes such as process 500 The results including the anchors, new synthetic utterances, classification results of the synthetic utterances, the confidence levels associated with the anchors, or any combination thereof may be sent with the job identifier to a database or cloud storage device 830 (e.g., an object store) for storage by workflow engine 825 and/or intent server 815.

Figure 7:
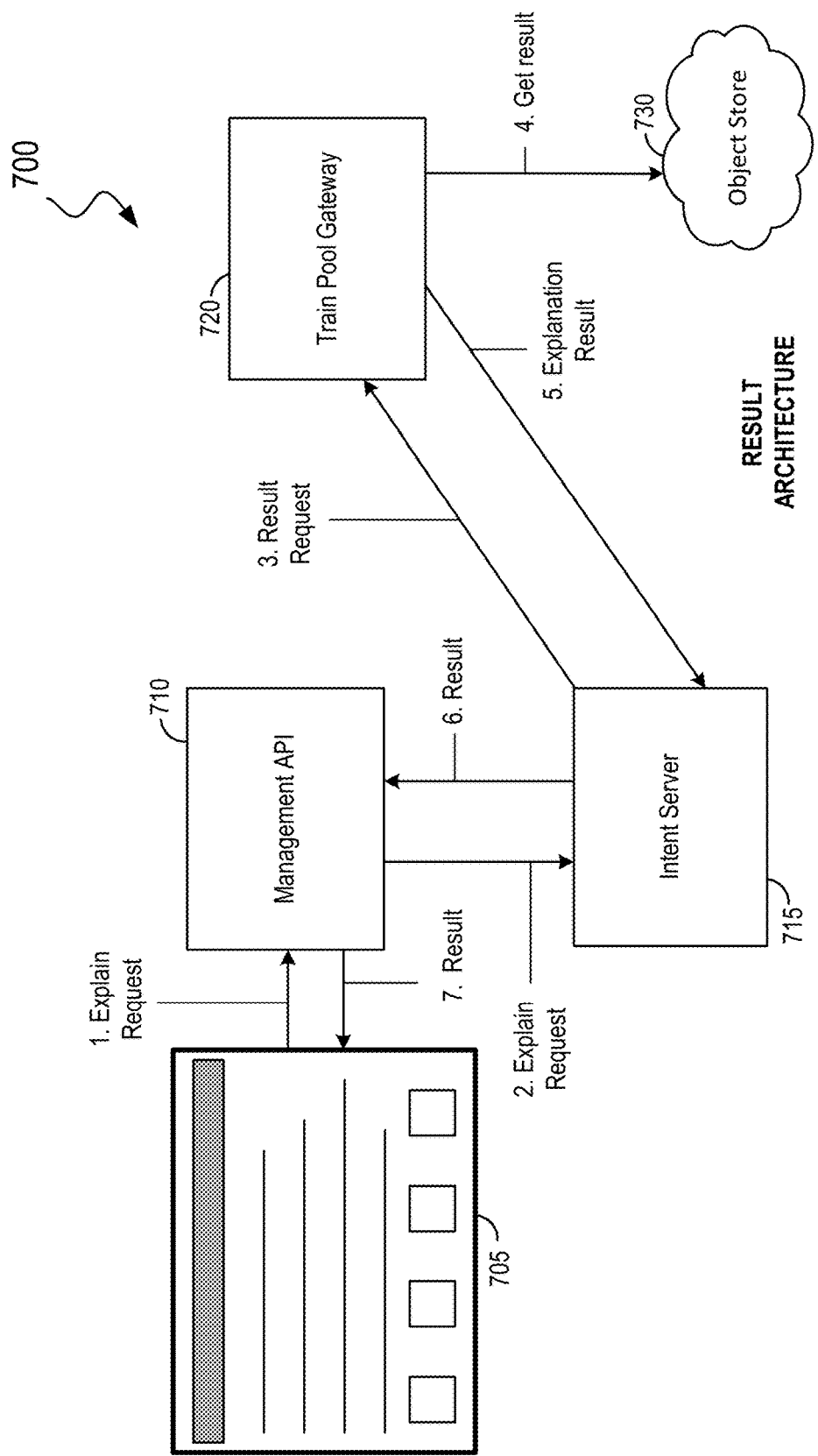
FIG. 7 illustrates an example of a system for providing explanations for text classifications according to various embodiments.

FIG. 7 illustrates an example of a system 700 for retrieving an explanation of an inference result according to certain embodiments. As with system 600, system 700 may include a user interface 705, a management API 710, an intent server 715, a gateway 720, and a database or cloud storage device 730. A user may submit an explanation result request with a job identifier to the gateway 720 through, for example, the user interface 705 and the management API 710 using an asynchronous call. In some instances, upon receipt of the asynchronous call by the management API 710, the management API 710 forwards the call to the intent server 715 for routing to the gateway 720. In other instances, upon receipt of the asynchronous call by the management API 710, the management API 710 forwards the call directly to the gateway 720. In the instance that the intent server 715 receives the call, the intent server 715 forwards the call to the gateway 720. The gateway 720 retrieves the results including the anchors, synthetic utterances, classification results of the synthetic utterances, the confidence levels associated with the anchors, or any combination thereof based on the job identifier. The results are returned to the user via the intent server 715, the management API 710, and user interface 705. Multiple explanation result requests can be executed at a time using multiple job identifiers.

Figure 8A:
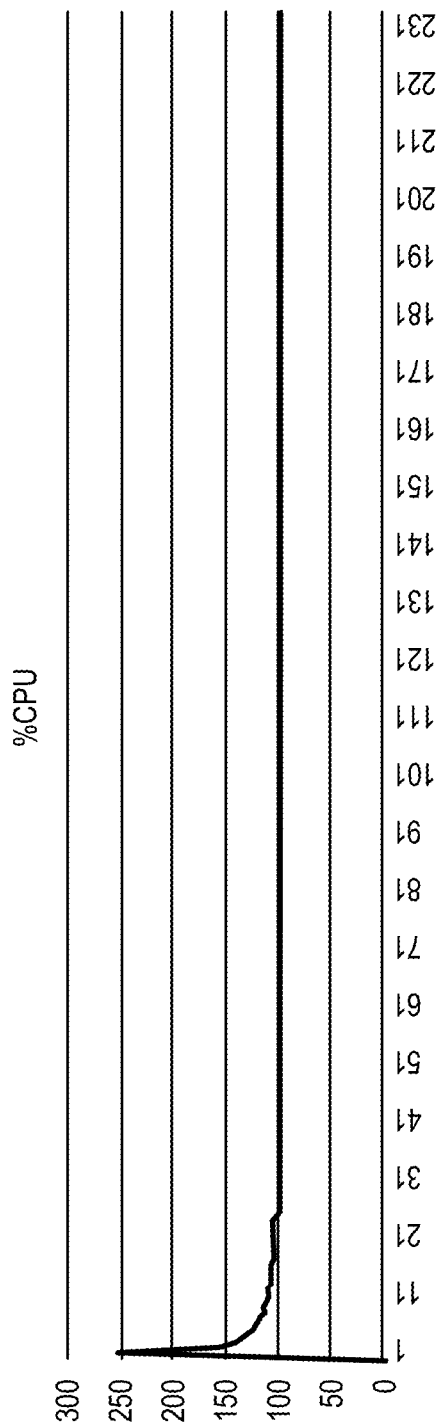
FIG. 8A illustrates an example of simulated CPU usage during an explanation computation according to various embodiments.

FIG. 8A illustrates an example of simulated CPU usage during an explanation computation according to certain embodiments. In the illustrated example, the utterance to be classified and explained is "another agent question." The run time is about 234 seconds. Specifically, FIG. 8A illustrates a level of central processing unit (CPU) resource use for performing an explanation of an inference result compared with the time required to complete the request.

Figure 8B:
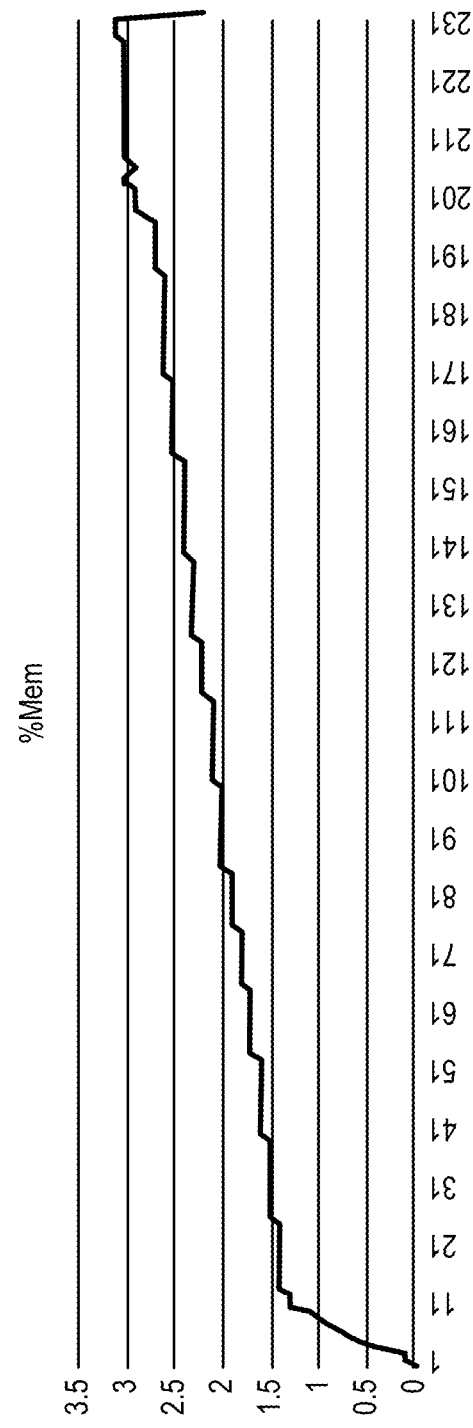
FIG. 8B illustrates an example of simulated memory usage during an explanation computation according to various embodiments.

FIG. 8B illustrates an example of simulated memory usage during the explanation computation according to certain embodiments. Specifically, FIG. 8B illustrates a level of memory resource use for performing an explanation of an inference result compared with the time required to complete the request.

Figure 9A:
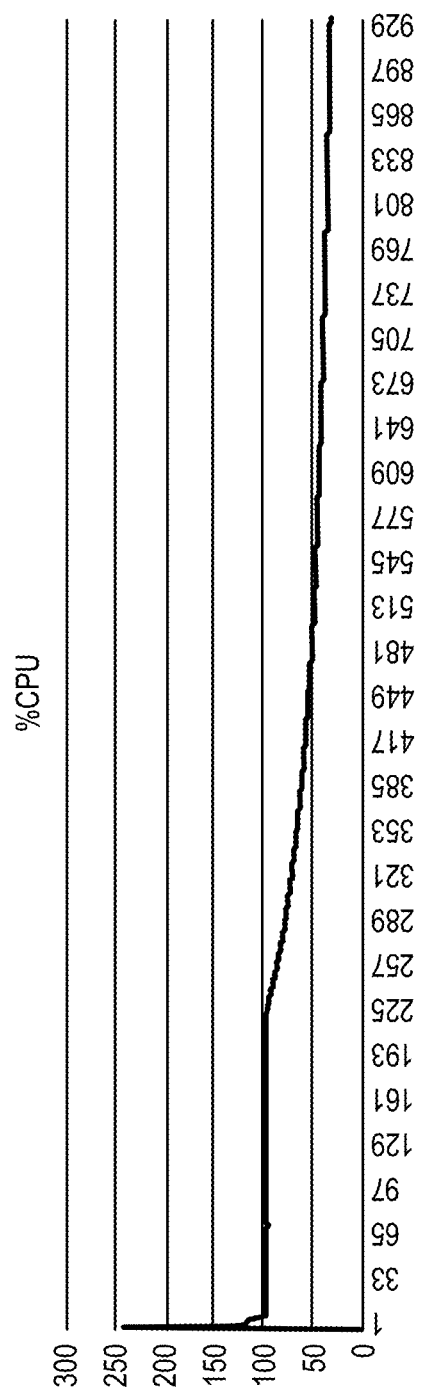
FIG. 9A illustrates an example of simulated CPU usage during an explanation computation according to various embodiments.

FIG. 9A illustrates an example of simulated CPU usage during an explanation computation according to certain embodiments. In the illustrated example, the utterance to be classified and explained is "I would like to have a large cheese pizza with a tall glass of coke." The run time is about 933 seconds. Specifically, FIG. 9A illustrates a level of central processing unit (CPU) resource use for performing an explanation of an inference result compared with the time required to complete the request.

Figure 9B:
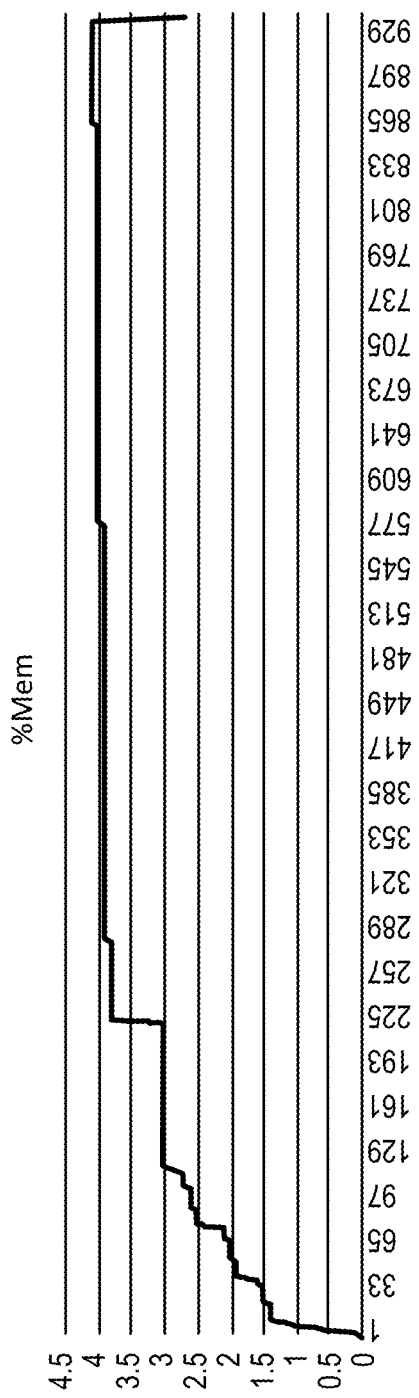
FIG. 9B illustrates an example of simulated memory usage during an explanation computation according to various embodiments.

FIG. 9B illustrates an example of simulated memory usage during the explanation computation according to certain embodiments. Specifically, FIG. 9B illustrates a level of memory resource use for performing an explanation of an inference result compared with the time required to complete the request.

Figure 10A:
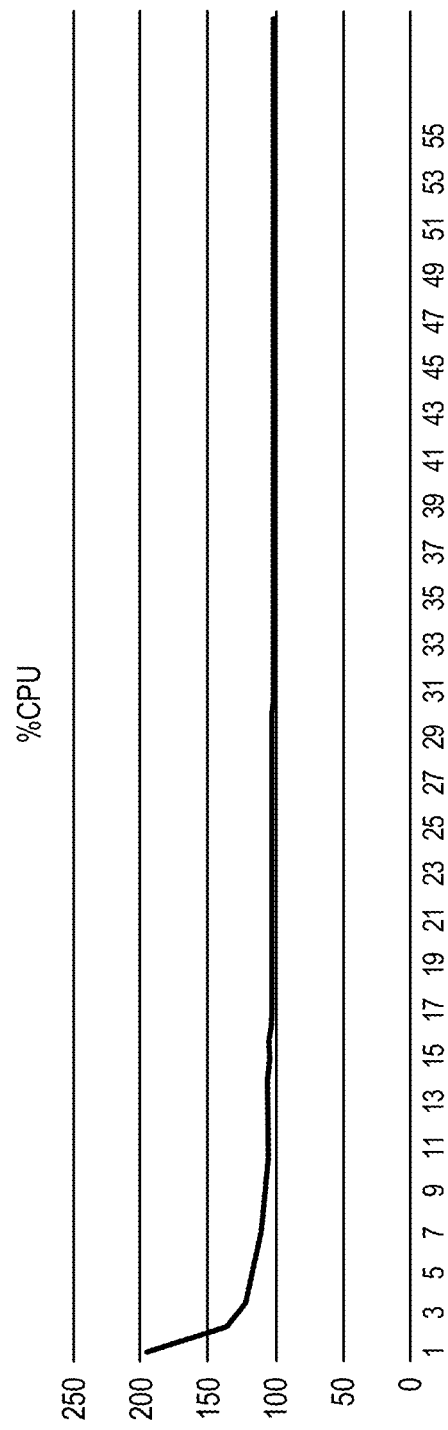
FIG. 10A illustrates an example of simulated CPU usage during an explanation computation according to certain embodiments.

FIG. 10A illustrates an example of simulated CPU usage during an explanation computation according to certain embodiments. In the illustrated example, the utterance to be classified and explained is "question." The run time is about 101 seconds. Specifically, FIG. 10A illustrates a level of central processing unit (CPU) resource use for performing an explanation of an inference result compared with the time required to complete the request.

Figure 10B:
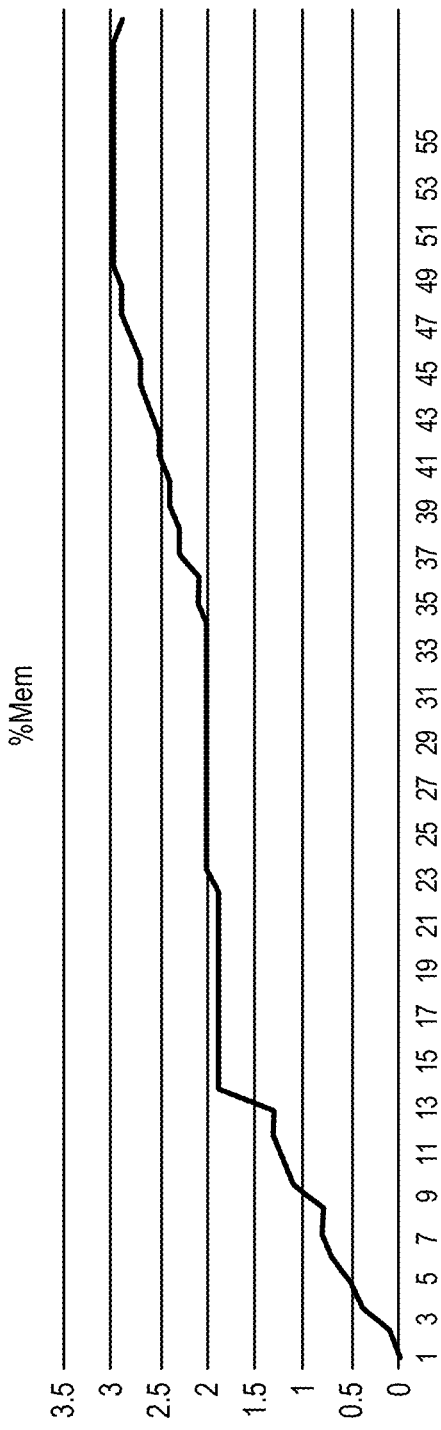
FIG. 10B illustrates an example of simulated memory usage during an explanation computation according to various embodiments.

FIG. 10B illustrates an example of simulated memory usage during the explanation computation according to certain embodiments. Specifically, FIG. 10B illustrates a level of memory resource use for performing an explanation of an inference result compared with the time required to complete the request.

Techniques for Generating a Training Dataset

As described above, generating a report including indications of synthetic utterances, predicted intents/skills for the synthetic utterances, and corresponding confidence values for the synthetic utterances is useful in determining how a chatbot system is processing received utterances. The report may be used to determine some deficiencies in the chatbot system. For example, the chatbot system may be incorrectly processing certain anchor words in an utterance and predicting incorrect intents/skills to associate with that utterance. Though the elimination of the "black box" of ML determinations is very useful in identifying chatbot system deficiencies, the chatbot system must then be retrained to prevent incorrect predictions from occurring again.

The process of training and retraining a chatbot is difficult and resource intensive. For example, areas of the chatbot ML model that are deficient must first be identified. Then a training dataset must be generated that will effectively reduce those deficiencies. The training dataset will include sets of training utterances and "ground truth" intents/skills corresponding to the training utterances. The ML model will then be trained using the training utterances using the ground truth intent/skills to refine the model to better predict intents/skills for utterances. Obtaining the training dataset is difficult and manually selecting and building a training dataset is inefficient and resource intensive.

Figure 11:
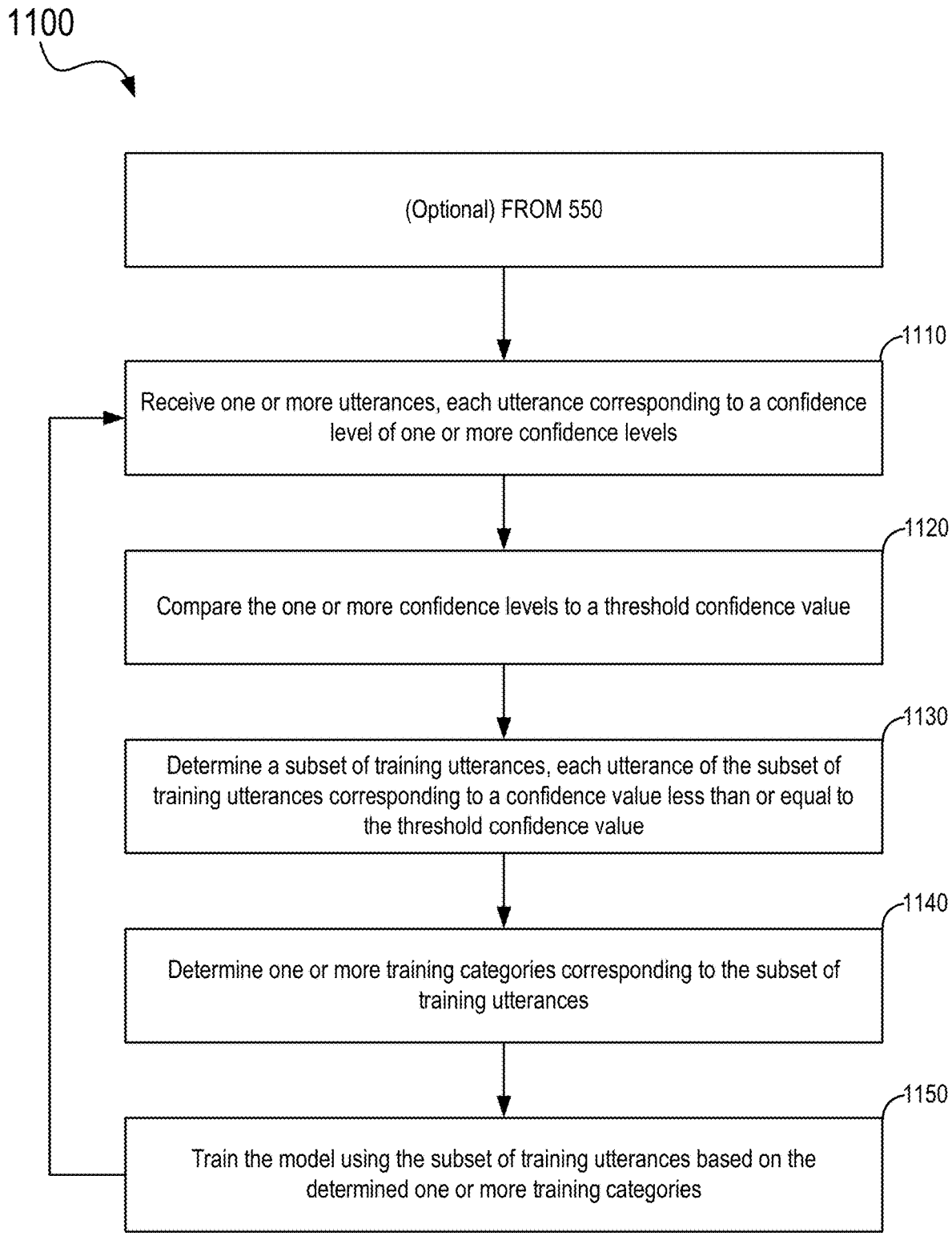
FIG. 11 is a simplified flowchart illustrating an example of a process for retraining models using artificial utterances according to various embodiments.

FIG. 11 is a simplified flowchart illustrating an example of a process for retraining models using synthetic utterances according to certain embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-5, the processing depicted in FIG. 11 may be performed by a pre-processing subsystem to retain models using synthetic utterances according to certain embodiments. The machine learning model may include, for example, a neural network model, or any other machine learning models, and may be used as, for example, a classifier that classifies user intents based on user utterances.

More specifically, process 1100 describes a process for obtaining a training dataset and retraining a ML model for predicting intents/skills based on input utterances. As described above, with reference to FIG. 5 and process 500, a number of synthetic utterances are generated corresponding to a set of anchors for an original utterance and an ML model operating as part of a chatbot system. The synthetic utterances generated as part of process 500 may be used to identify deficiencies with the ML model, specifically with processing the original utterance and similar utterances. In this case, it is beneficial to retrain the ML model using the original utterance and/or similar utterances and corresponding ground truths to improve the model function. It will be appreciated that the synthetic utterances generated in steps 530-550 are excellent candidates for retraining a machine learning model.

Process 1100 may optionally start at 550 of process 500, where a set of anchors with the highest confidence levels is identified. In some embodiments, process 1100 begins when process 550 can completed a last iteration of the iteration of blocks 530-550 and a set of anchors with the highest confidence levels is identified. The set of anchors and corresponding synthetic utterances is then utilized as part of process 1100 to generate a training dataset for retraining the ML model. In some embodiments, process 1100 operates in parallel with 560 of FIG. 5. Specifically, the synthetic utterances may be used in process 1100 at the same time that a report including the set of anchors is generated.

Process 1100 continues at 1110, where one or more utterances are received, each utterance corresponding to a confidence level of one or more confidence levels. In some embodiments where the process 1100 began at step 550 of process 500, the one or more utterances are synthetic utterances generated as part of a report generation process. For example, in response to receiving a request to explain an inference result, a system executing process 500 may also automatically generate a retraining dataset for a particular ML model relating to the utterance specified in the request.

In other embodiments, the one or more utterances are utterances stored in a computer memory at a previous time. For example, the one or more utterances may be utterances corresponding to predicted intents/skills as predicted by a ML model that will be retrained according to process 1100. The utterances may have previously been stored for future training of the ML model, for example as part of a previous iteration of process 500.

Each utterance corresponds to a confidence level. As described herein, a confidence level represents the strength of a set of anchors' correlation to a particular utterance based on the proportion of synthetic utterances for the set of anchor that are classified to the same intent/skills as the particular utterance. For example, each synthetic utterance may correspond to a determined confidence value of a set of anchors used to generate the synthetic utterance. In some embodiments, each synthetic utterance independently corresponds to a confidence value. For example, the level of correspondence between nodes of a trained neural network ML model may be used to determine the confidence level of a synthetic utterance when making a prediction of a particular intent/skill given the particular utterance as input. In some embodiments where process 1100 begins at 550 of process 500, the one or more synthetic utterances already correspond with confidence levels as determined in step 540 of process 500.

At 1120, the one or more confidence values received in 1110 are compared to a threshold confidence value. Specifically, each confidence value of the one or more confidence values is compared to the threshold confidence value to determine a subset of confidence values that do not meet or exceed the threshold. In various embodiments, the threshold confidence value is a value corresponding to a relative permissible level of correspondence to a predicted intent/skill for a particular utterance. For example, a training dataset is often most useful for training a ML model when the ML model already does not predict intents/skills associated with the utterances of the training dataset with a high degree of confidence. The result of training will be that the ML model will, after training, predict the intents/skills corresponding to similar utterances with a higher level of confidence. Therefore, it is most useful to select utterances to include in a training dataset corresponding to a confidence level that falls at or below a desired threshold of confidence. Utterances corresponding to confidence levels that are higher than the threshold may be useful in training the ML model, but will not impact the training of the model as efficiently as utterances corresponding to confidence levels below the threshold.

In some embodiments, the confidence level threshold may be determined based on some input from an entity associated with the chatbot system and ML model. Specifically, an entity owning or operating the chatbot system, and therefore the ML model, may specify the threshold of confidence to optimize the generation of new training datasets. For example, a client hosting the chatbot system may determine to set the threshold confidence values at a certain value which enables a sufficient training dataset to be generated, but to keep the training dataset sufficiently small at to retrain the model in a certain amount of time. In some embodiments, a threshold confidence value may be suggested to a client for use based on metrics associated with the utterances received in 1110.

At 1130, a subset of training utterances is determined, each utterance of the subset of training utterances corresponding to a confidence value less than or equal to the threshold confidence value. Any utterance in the one or more received utterances corresponding to a confidence level less than or equal to the threshold confidence value will be included in the subset of training utterances and ultimately used to retrain the model. For example, a threshold confidence value may be set at a value of 0.80 (or 80% confidence). A confidence value corresponding to a first utterance of the one or more utterances may be 0.90 (or 90% confidence that the utterance corresponds to a particular intent/skill). A confidence value corresponding to a second utterance may be 0.67 (or 67%). The first utterance is not determined to be in the subset of training utterances, because its corresponding confidence level is greater than the threshold confidence value. The second utterance is determined to be in the subset of training utterances because its corresponding confidence level is less than or equal to the threshold confidence value. In some embodiments, the threshold may further specify certain criteria for which utterances may be obtained, for example the criteria that the subset of training utterances only contain utterances corresponding to confidence values less than or equal to the threshold confidence value. It will be appreciated by one having ordinary skill in the art that any criteria relative to the threshold value may be used. For example, in alternative embodiments, only utterances having probabilities greater than or equal to the threshold may be selected for the purpose of fine-tuning a ML model to predict certain intents/skill for utterances in particular. It is often important for a client to understand which utterances are correspond to less confident predictions to understand how to retrain a ML model. In some cases, a client may also request explanations for utterance classification with higher confidence values to understand why the model predicts intents/skills with a higher rate of confidence.

At 1140, one or more training categories corresponding to the subset of training utterances are determined. Specifically, the one or more training categories are the ground truths associated with the subset of training utterances that will be used to train the ML model. For example, a client may access the listing of the subset of training utterances. The client may then select a ground truth intent/skill for each utterance of the subset of training utterances to form a complete training dataset. In some embodiments, the one or more training categories may be represented with an interactive list of possible intents/skills to which an utterance may correspond as a correct ground truth prediction by a ML model. The ground truth intent may be selected from the interactive list of one or more known intents associated with the ML model. Once selected, the ground truth intents are used to create a new set of training data. An interactive list of ground truth intents to be associated with the subset of training utterances is described herein, including in FIG. 12 below.

At 1150, the model is trained using the subset of training utterances based on the determined one or more training categories. The new set of training data may be input to one or more ML models to train the ML models. For example, the determined subset of training utterances are used to retrain a trained ML model according to the ground truth training categories determined in 1140. One result is that utterances previously classified to incorrect predicted intents/skill as determined by a report, such as the report generated in 560, will be used to train the ML model to more efficiently predict a correct intent/skill for a similar utterance. Another result is that utterances previously classified to a correct predicted intent/skill, but at a confidence level below an acceptable confidence level (i.e., the threshold confidence value), are used to further reinforce correct model prediction behaviors.

In various embodiments not pictured in FIG. 11, one or more new synthetic utterances may be generated which are similar to one or more received utterances in 1110, and based on the threshold confidence value. For example, to create a more comprehensive training dataset for retraining a model, one or more new synthetic utterances may be generated based on word or phrase substitutions, similar to step 530 of process 500. The new synthetic utterances may be based on anchor substitutions described above in 530 or another technique. For example, one or more new synthetic utterances may be generated in response to determining the subset of training utterances at or below the threshold confidence value. These artificial utterances may be included in a set of retraining data and may correspond to determined training categories as set by a user. For example, if a training dataset must contain a certain size of utterances, the one or more new synthetic utterances may be generated and used to supplement the training dataset. In other embodiments, the threshold confidence value may be raised or lowered automatically to satisfy a required number of utterances in the training dataset.

In various embodiments not pictured in FIG. 11, the subset of training utterances undergo a context-based filtering process prior to their use in retraining the ML model. The context-based filtering process will refine the utterances to comport with an environment-specific context. For example, a customer-service chatbot may belong to a contextual environment that prohibits profane or offensive speech patterns. The obtained one or more utterances and/or the synthetic utterances may be filtered to remove all profane or offensive language from the utterances prior to retraining. For example, profane words may be replaced with similar words that are not profane prior to training to model in order to reduce profane bias in the newly trained ML model. In another example, a machine learning model may belong to a contextual environment that is prohibited from including personal identifying information in any responses to queries. The subset of training utterances may be filtered to replace any proper nouns or personal identifying information in utterances with generic information/words. The filtering process may comprise any filtering to achieve a goal of an environment-specific training process.

Blocks 1110-1150 of process 1100 may be performed iteratively where the subset of training utterances is iteratively generated based on the results of a previous retraining. For example, after retraining a model 1150, the utterances in the training dataset may be modified to generate a testing dataset of similar utterances to the subset of training utterances. The testing dataset may be input to the newly trained ML model to predict classifications for each utterance in the testing dataset. The utterances of the testing dataset and corresponding confidence values for the utterances may then be used to repeat step 1110 of process 1100 to further retrain the ML model. In various embodiments, the operations 1110-1150 are repeated iteratively until no confidence values for generated utterances are less than or equal to the threshold value.

FIG. 12 illustrates an example interface for retraining models using synthetic utterances according to certain embodiments. Specifically, FIG. 12 depicts an example interface 1200 for generating a training dataset for retraining a machine learning model. The interface depicted in FIG. 12 may be utilized by an entity, such as a client or user to generate an set of training data for improving the function of a ML model. Interface 1200 includes threshold field 1210. Threshold field 1210 may be a field which displays a threshold confidence value as utilized in process 1100. Threshold field 1210 may be an interactive portion of interface 1200 which a client may manipulate to input the threshold confidence value. For example, as described with reference to FIG. 11 above, a threshold confidence value may be set for determining a subset of training utterances that do not correspond to a confidence level (e.g. "confidence score" as depicted in FIG. 12) above the threshold confidence value.

As depicted in FIG. 12, one or more utterances received are displayed in a comprehensive listing on interface 1200. For example, as depicted in FIG. 12, interface 1200 includes utterance list 1220. In some embodiments, utterance list 1220 is a listing of one or more received utterances, such as utterances received in step 1110 of process 1100. It is noted, with respect to FIG. 12, that the obtained and displayed utterances in utterance list 1220 are variations of similar utterances, and may be the result of the processes for synthetic utterance generation described above with respect to process 500 and specifically block 530. Interface 1200 includes predicted intent list 1230. Predicted intent list 1230 is displayed alongside utterance list 1220 in order to show, as part of the comprehensive interface, the intents to which the displayed utterances are predicted to correspond. For example, the utterances depicted in utterance list 1220 are shown alongside predicted intents in intent list 1230 that were previously predicted in a classification results step, such as 540 of process 500.

Interface 1200 includes confidence score list 1240. Confidence score list 1240 may be displayed alongside utterance list 1220 and predicted intent list 1230 in order to show, as part of the comprehensive interface, the corresponding confidence level relating to the predicted intent and input utterance with which it is displayed. Interface 1200 comprise interactive intent selector 1250. Interactive intent selector 1250 is an interactive element of interface 1200 which allows a client utilizing the interface to select a ground truth intent corresponding to a corresponding utterance to include in a training dataset, for example, as part of 1140 of process 1100. The selected utterance in interactive intent selector 1250 may be used as the ground truth intent for the corresponding utterance and cause inclusion of the utterance in the subset of training utterances, provided the utterance is associated with a confidence score less than or equal to the confidence score. Thus, a client utilizing interface 1200 may generate comprehensive training datasets with utterances without the requirement to manually create new training utterances from scratch.

Figure 13:
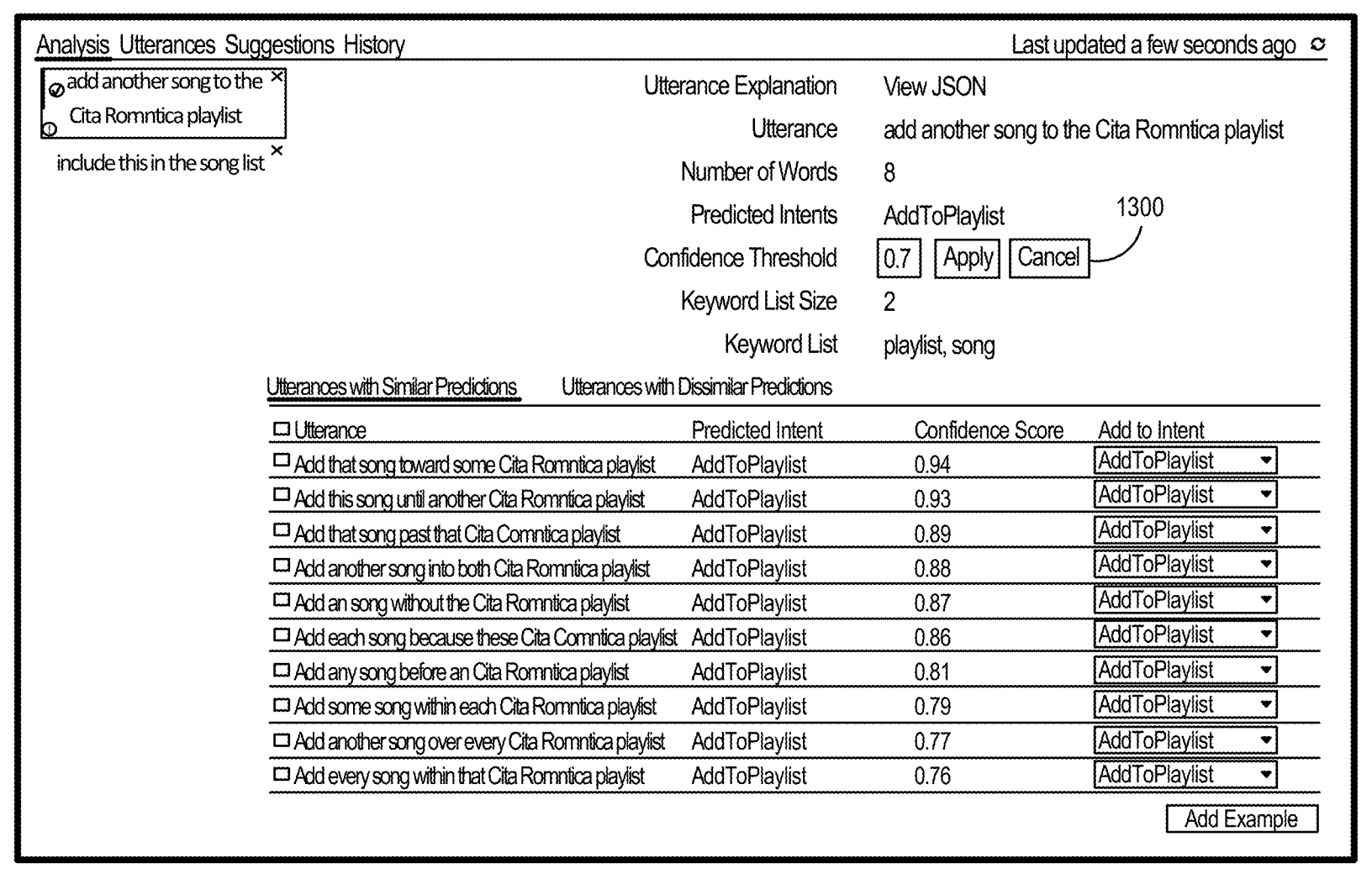

FIG. 13 illustrates an example interface for retraining models using synthetic utterances according to certain embodiments. Specifically, FIG. 13 depicts the comprehensive interface 1200 of FIG. 12 with an additional interactive field. Threshold input field 1300 is an interactive threshold field which into which a specified threshold confidence value may be entered. Threshold input field 1300 may correspond to threshold field 1210 after a user has interacted with the field. A user of the interface depicted in FIG. 13 may utilize the interface to perform the methods described herein, including the process described in FIG. 11. For example, a user may first specify a threshold confidence value in threshold input field 1300 that will be used as part of process 1100, and specifically blocks 1120 and 1130. The input threshold confidence value will be used to determine the subset of utterances for inclusion in the training dataset for training the ML model.

In various embodiments, not depicted in FIG. 13, a button or other interactive element may be coupled to a displayed utterance, which, when interacted with, will cause the generation of synthetic utterances similar to the displayed utterance. The client may select the interactive button or element of the interface to begin generation of a set of training datasets based on inputs made by the client. In various embodiments, only utterances selected manually by the client using checkboxes next to the displayed utterances will be used in the retraining data, instead of only utterances associated with a confidence value at or below a threshold confidence value. An example of generating synthetic utterances according to certain embodiments is shown below in a JavaScript Object Notation (JSON) script. For example, the generation of synthetic utterances described by the script below could be used in synthetic utterance generation processes such as 530 and/or process 1100.

TABLE 2

Explanation section of an example of generating synthetic utterances (in JSON)

```
{
"provided_utterance":"b'Add another song to the Cita Romntica playlist,'",
"number_words":8,
"prediction";" AddToPlaylist ",
"anchor_beam_value":1,
"anchor_threshold_value":0.1,
"anchors_with_confidence_threshold":{
"anchor list":{
"playlist",
"song"
],
"anchor_list_size":"2",
"precision":"0.9634551495016611",
"utterances_with_similar_predictions":{
"b'Add another song into both Cita Romantica playlist . "':{
"intent":"AddToPlaylist",
"score":0.8899
},
"b'Add some song within each Cita Romantica playlist, "':{
"intent":"AddToPlaylist",
"score":0.7959
},
"b'Add some song within each Cita Romntica playlist , "':{
"intent":"AddToPlaylist",
"score": 0.7779
},
"b'Add some song within each Cita Romntica playlist , "':{
"intent":"AddToPlaylist",
"score":0.8529
},
"b'Add some song within each Cita Romantica playlist, "':{
"intent":"AddToPlaylist",
"score":0.9499
},
"b'Add some song within each Cita Romntica playlist , "':{
"intent":"AddToPlaylist",
"score":0.9366
},
"b'Add some song within each Cita Romntica playlist , "':{
"intent":"AddToPlaylist",
"score":0.8748
},
"b'Add some song within each Cita Romntica playlist , "':{
"intent":"AddToPlaylist",
"score":0.7632
},
"b'Add some song within each Cita Romntica playlist , "':{
"intent":"AddToPlaylist",
"score":0.8193
},
```

TABLE 2-continued

Explanation section of an example of generating synthetic utterances (in JSON)

"b'Add some song within each Cita Romntica playlist , '":{
"intent":"AddToPlaylist",
"score":0.8953

Specifically, steps for generating similar synthetic utterances that are based on a particular utterance are shown. The steps correspond to creation of a set of synthetic utterances (utterances not written manually or taken from an utterance repository) for retraining a model. The synthetic utterances are generated and added to a data object "utterances_with_similar_predictions" as part of retraining data generation. The utterances are added with a "b'Add" command.

Combined Interfaces for Requesting Reports and Generating Training Datasets

FIG. 14 illustrates an example interface for explaining an inference result as part of a training dataset generation process, according to certain embodiments. Specifically, FIG. 14 depicts an interface 1400 for displaying a comprehensive analysis one or more inference results given an utterance according to certain embodiments. For example, FIG. 14 contains an interactive interface 1400 displaying inference results associated with prediction made by a machine learning model given some input utterance. The interface 1400 depicts a listing of various inference results displayed according to some criteria. As depicted in FIG. 14 all utterances where the inference result included a classification of the input utterance as matching the intent "unresolvedIntent" intent are displayed. The corresponding utterances are displayed along with the corresponding inference result on interface 1400.

The inference result includes the intent predicted to most closely correspond to the utterance, as well as other intents which may possibly have corresponded to an utterance. For example, in the first row, an utterance of "add another song to the Cita Romntica playlist" is displayed along with various aspects of the utterance determined in the inference result. In addition to the "unresolvedIntent" intent predicted to correspond to the utterance, the "Win Margin," is also displayed. The win margin is a score corresponding to a predicted probability that the result intent corresponds to the utterance. In some embodiments, the win margin is a calculated difference between a first confidence value representing a primary intent/skill predicted as corresponding to an utterance and a second confidence value representing a secondary intent/skill predicted as corresponding to the utterance.

The inference report also includes an intents score chart showing a breakdown of potential predictable intents and relative confidence levels of correspondence between the utterance and a predicted intent. The inference report includes an interactive intent selection field. The interactive intent selection field may be presented proximate to a suggestion button that will autofill a field with a suggested corresponding intent when interacted with. The autofill field may be used to generate a utterance and ground truth training category pair for inclusion in a training dataset for retraining a model. For example, a client may select the checkbox next to the utterance "add another song to the Cita Romntica playlist." The client may then press a button, such as the "Add Example" button of interface 1400 to cause generation of a training data point including the utterance and a corresponding ground truth intent selected by the client. The training data point may then be included in a training dataset to train the ML model of the chatbot system in the future.

Interface 1400 also comprises a button for analyzing a queue of inference results. For example, instead of pressing the "Add Example" button to generate a training data point, a client may press the "Add to Analyze Queue" button to request an explanation report relating to the inference result given the corresponding utterance, as described in process 500 of FIG. 5.

FIG. 15 illustrates an example interface for explaining an inference result according to certain embodiments. Specifically, FIG. 15 depicts an interface similar to interface 1400 after an inference result and corresponding utterance have been selected for introduction to an analysis queue. Notification 1500 may be included on the interface to notify a user that a selected inference result has been added to a queue of inference results for which requests have been requested. For example, by a selecting an inference result using a checkbox in interface 1400, and clicking the "Analyze Queue" button, a process such as process 500 may be initiated for a corresponding utterance and ML model associated with the selected inference result and utterance. Notification 1500 may then alert the user that the particular inference result being analyzed and an explanation report in being generated.

Figure 16:
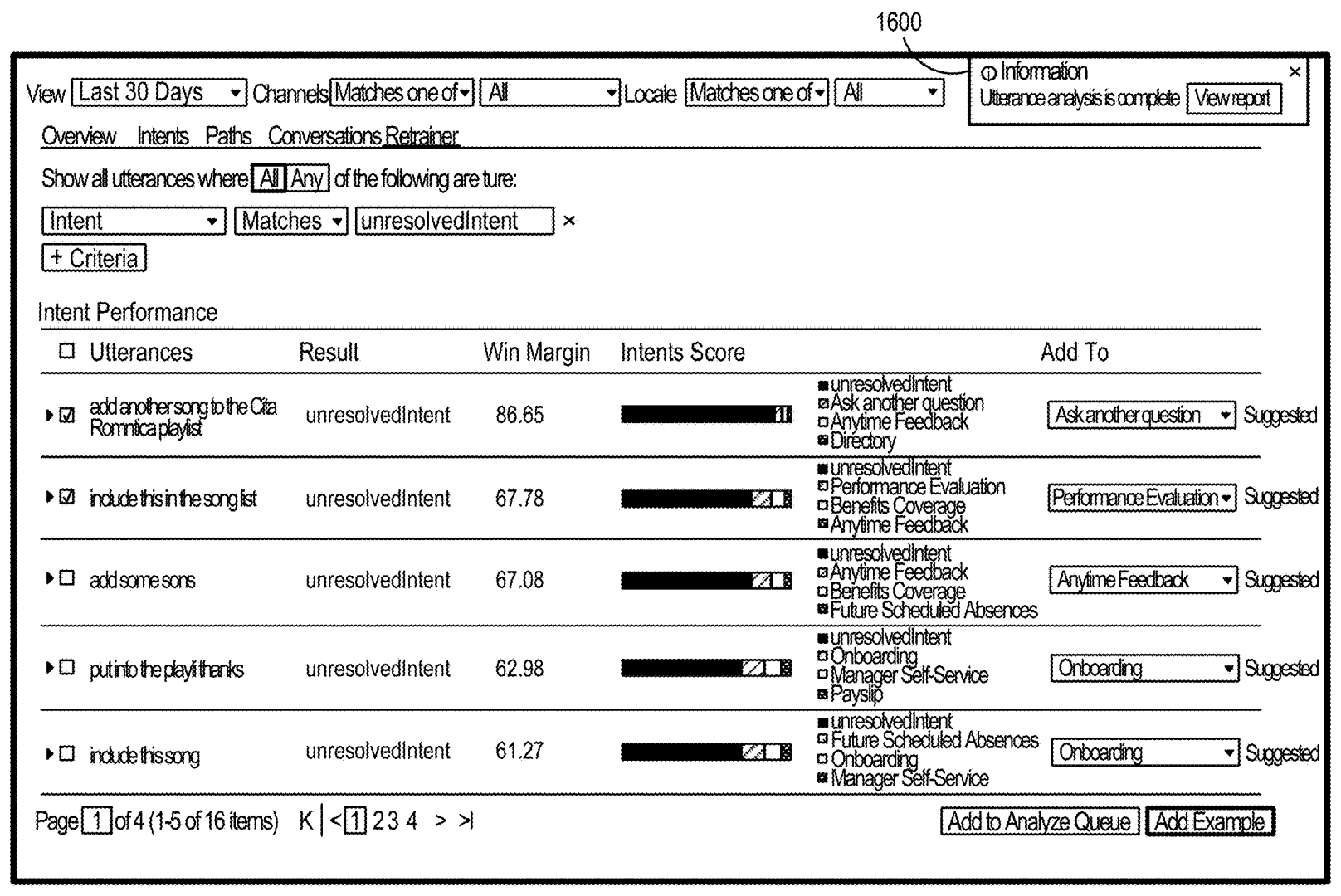

FIG. 16 illustrates an example interface for explaining an inference result according to certain embodiments. Specifically, FIG. 16 depicts an interface similar to interface 1400/1500 after an utterance has been analyzed by an utterance analysis tool, such as an utterance analysis tool that utilizes process 500. Notification 1600 may be included on the interface to notify a user that a selected inference result/utterance has been analyzed and that a report is ready for viewing.

Figure 17:
FIG. 17 illustrates an example interface for explaining an inference result according to various embodiments.

FIG. 17 illustrates an example interface for explaining an inference result according to certain embodiments. Specifically, FIG. 17 depicts an interface similar to interface 1400/1500/1600 while an explanation report is pending and has not yet finished generating. For example, while a client or user of the interface is waiting for an explanation report to generation, a user may see the displayed interface depicted in FIG. 17 to inform a user that an explanation analysis is not yet complete.

An example of submitting a request for an explanation for the classification result of an utterance according to certain embodiments is shown below in a JavaScript Object Notation (JSON) script.

TABLE 3

Explanation section of an example of generating synthetic utterances (in JSON)

```
[
  {
    "appId ": "A0AE02E9 -FE84 -4C96-A056-CAD9D4D1BFE6",
    "botName": "afin",
    "entityMatches": { },
    "intentMatches": {
        "summary": [
        {
        "intent ": "unresolvedIntent ",
        "score": 0
        }
    ]
    "detail": {
        "final_norm": [
        {
        "intent ": "unresolvedIntent ",
        "score": 0,
        "sentence": [ ]
        }
    ]
    }
    "unresolvedType": null
},
"query": "money available ",
"timeStamp ": 1597859806129,
"trainingDataUnit": {
    "sentence ": "money available ", "intent ": null,
    "namedEntities": [ ],
    "translated" : null,
    "detected tanguage": null,
    "translatedlanguage ": null,
    "translatedBy ": null
},
"coreTerms": "money available getexplain ",
"debugEntries": [ ] ,
"nerEntities": null,
"explanation ": {
  "explain_beam_value": 4,
  "generated_queries": 630,
  "explain_without_confidence_threshold ": {
      "explain_word_list_size": "2",
      "utterances_with_similar_predictions ": {
      "money available ": {
      "Balances": 1
      }
  },
  "utterances_with_dissimilar_predictions ": { },
  "prediction_value": 1,
  "precision ": "1.0",
  "prediction ": "Balances",
  "explain_word_list ": [
  "available ",
  "money"
  ],
  "partial ": {
  "money" : {
  "utterances_with_similar_predictions ": {
    "money available": {
      "Balances": 1
      }
  },
  "utterances_with_dissimilar_predictions": { },
  "precision ": "1.0",
  "explain_word_list ":
  "available ",
  "money"
  ]
```

In the example shown, the request may be submitted by entering a query (e.g., an utterance "money available"), followed by a command "getexplain." A JavaScript Object Notation (JSON) file may be generated for the query and the explanation request, as shown.

Figure 18:
FIG. 18 illustrates an example of an output of an explanation for a classification of an utterance according to various embodiments.

FIG. 18 illustrates an example of an output of an explanation for a classification of an utterance according to certain embodiments. In the illustrated example, the utterance analyzed is "another agent question" as shown in the table above. The output may include a link 1810 to a report, a list of anchors 1820 selected, for example as part of 530 of process 500, and the corresponding confidence levels 1830 for the each set of anchors of the list of anchors 1820. For example, the confidence level associated with anchor set "question" may be about 33.8%, corresponding to a 0.33 confidence metric that a correct intent was predicted for an input utterance. The confidence associated with anchor "question another", using the anchor words "question" and "another" is about 100%. The represents a predicted correct answer with complete accuracy given the anchor words (e.g., the ML model have previously been trained on those anchor words in great volume).

Figure 19:
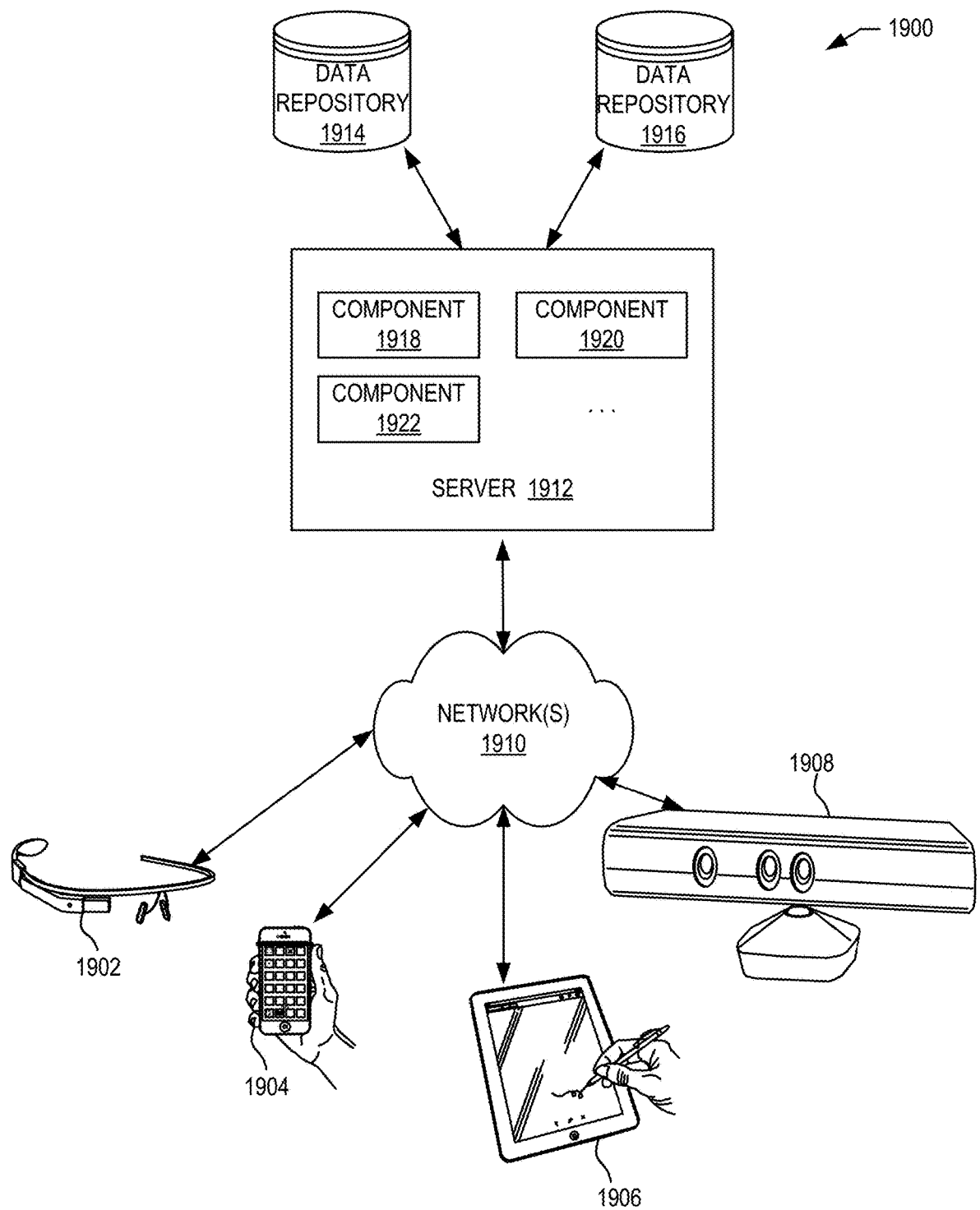
FIG. 19 depicts a simplified block diagram of an example of a distributed system for implementing various embodiments.

FIG. 19 depicts a simplified diagram of a distributed system 1900 for implementing some embodiments. In the illustrated example, distributed system 1900 includes one or more client computing devices 1902, 1904, 1906, and 1908, coupled to a server 1912 via one or more communication networks 1910. Clients computing devices 1902, 1904, 1906, and 1908 may be configured to execute one or more applications.

In various examples, server 1912 may be adapted to run one or more services or software applications that enable one or more embodiments described in this disclosure. In certain examples, server 1912 may also provide other services or software applications that may include non-virtual and virtual environments. In some examples, these services may be offered as web-based or cloud services, such as under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in FIG. 19, server 1912 may include one or more components 1918, 1920 and 1922 that implement the functions performed by server 1912. These components may include software components that may be executed by one or more processors, hardware components, or combinations thereof. It should be appreciated that various different system configurations are possible, which may be different from distributed system 1900. The example shown in FIG. 19 is thus one example of a distributed system for implementing an example system and is not intended to be limiting.

Users may use client computing devices 1902, 1904, 1906, and/or 1908 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 19 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 1910 may be any type of network familiar to those skilled in the art that may support data communications using any of a variety of available protocols, including without limitation TCP/IP (transmission control protocol/Internet protocol), SNA (systems network architecture), IPX (Internet packet exchange), Apple-Talk®, and the like. Merely by way of example, communication network(s) 1910 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth R, and/or any other wireless protocol), and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 may include one or more virtual machines running virtual operating systems, or other computing architectures involving virtualization such as one or more flexible pools of logical storage devices that may be virtualized to maintain virtual storage devices for the server. In various examples, server 1912 may be adapted to run one or more services or software applications that provide the functionality described in the foregoing disclosure.

The computing systems in server 1912 may run one or more operating systems including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle®, Microsoft®, Sybase®, IBM® (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more data repositories 1914, 1916. These data repositories may be used to store data and other information in certain examples. For example, one or more of the data repositories 1914, 1916 may be used to store information such as information related to storage virtual machines, information mapping application IDs to application to selected storage virtual machines, and other information used by server 1912 when performing authentication functions. Data repositories 1914, 1916 may reside in a variety of locations. For example, a data repository used by server 1912 may be local to server 1912 or may be remote from server 1912 and in communication with server 1912 via a network-based or dedicated connection. Data repositories 1914, 1916 may be of different types. In certain examples, a data repository used by server 1912 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1914, 1916 may also be used by applications to store application data. The data repositories used by applications may be of different types such as, for example, a key-value store repository, an object store repository, or a general storage repository supported by a file system.

Figure 20:
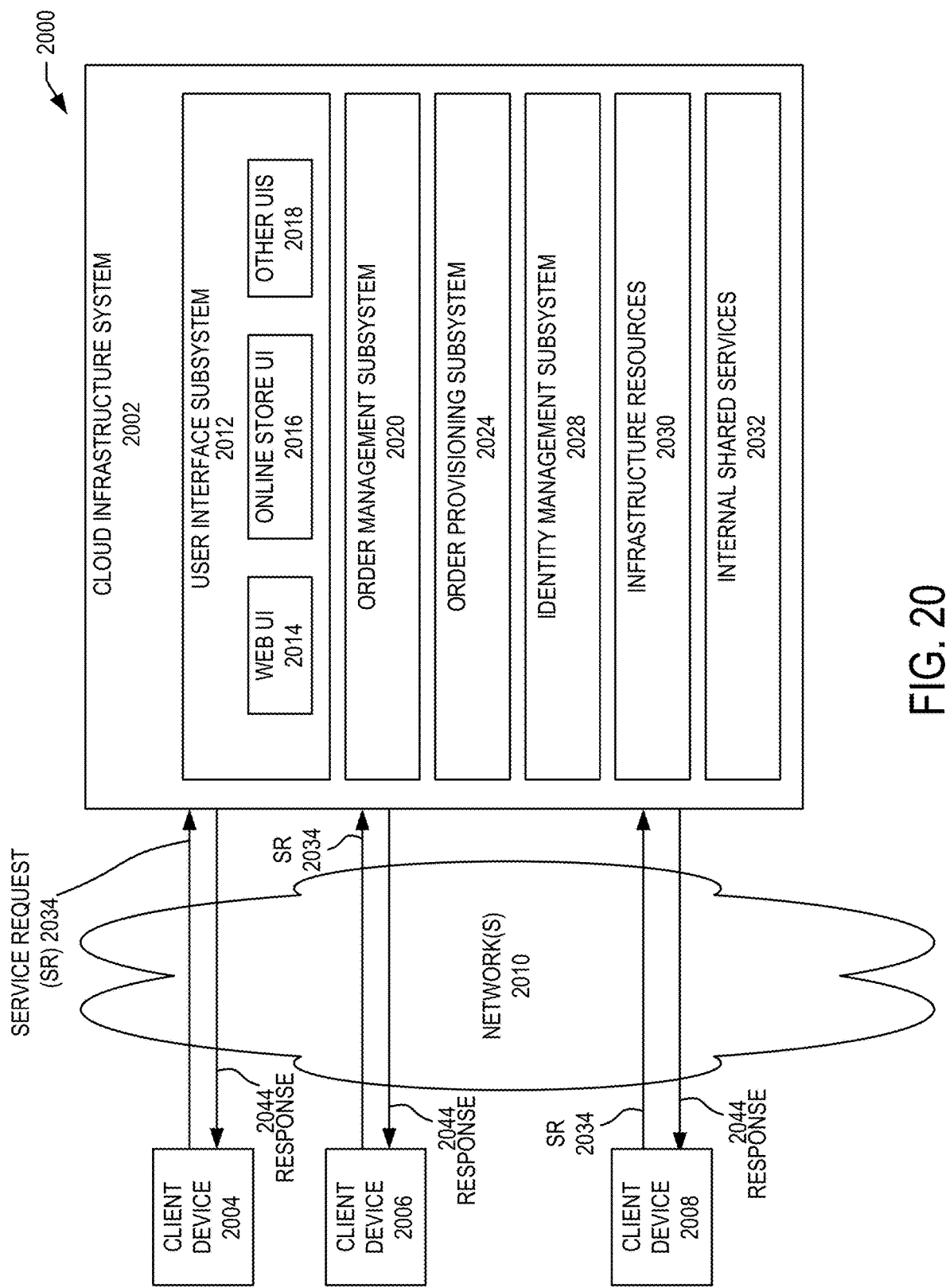
FIG. 20 is a simplified block diagram of an example of a cloud-based system environment for implementing various embodiments.

In certain examples, the functionalities described in this disclosure may be offered as services via a cloud environment. FIG. 20 is a simplified block diagram of a cloud-based system environment system 2000 for implementing some embodiments. In cloud-based system environment system 2000, various services may be offered as cloud services in accordance with certain examples. In the example depicted in FIG. 20, cloud infrastructure system 2002 may provide one or more cloud services that may be requested by users using one or more client computing devices 2004, 2006, and 2008. Cloud infrastructure system 2002 may comprise one or more computers and/or servers that may include those described above for server 1912. The computers in cloud infrastructure system 2002 may be organized as general purpose computers, specialized server computers, server farms, server clusters, or any other appropriate arrangement and/or combination.

Network(s) 2010 may facilitate communication and exchange of data between clients computing devices 2004, 2006, and 2008 and cloud infrastructure system 2002. Network(s) 2010 may include one or more networks. The networks may be of the same or different types. Network(s) 2010 may support one or more communication protocols, including wired and/or wireless protocols, for facilitating the communications.

The example depicted in FIG. 20 is only one example of a cloud infrastructure system and is not intended to be limiting. It should be appreciated that, in some other examples, cloud infrastructure system 2002 may have more or fewer components than those depicted in FIG. 20, may combine two or more components, or may have a different configuration or arrangement of components. For example, although FIG. 20 depicts three client computing devices, any number of client computing devices may be supported in alternative examples.

The term cloud service is generally used to refer to a service that is made available to users on demand and via a communication network such as the Internet by systems (e.g., cloud infrastructure system 2002) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 2002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2002. Cloud infrastructure system 2002 then performs processing to provide the services requested in the customer's subscription order. For example, a user may request the cloud infrastructure system to register an application, as described above, and provide services to the application per the application's specified requirements. Cloud infrastructure system 2002 may be configured to provide one or even multiple cloud services.

Cloud infrastructure system 2002 may provide the cloud services via different deployment models. In a public cloud model, cloud infrastructure system 2002 may be owned by a third party cloud services provider and the cloud services are offered to any general public customer, where the customer may be an individual or an enterprise. In certain other examples, under a private cloud model, cloud infrastructure system 2002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 2002 and the services provided may be shared by several organizations in a related community. Various other models such as hybrids of the above-mentioned models may also be used.

Client computing devices 2004, 2006, and 2008 may be of different types and may be capable of operating one or more client applications. A user may use a client device to interact with cloud infrastructure system 2002, such as to request a service provided by cloud infrastructure system 2002. For example, a user may use a client device to request an authentication-related service described in this disclosure.

In some examples, the processing performed by cloud infrastructure system 2002 for providing services may involve big data analysis. This analysis may involve using, analyzing, and manipulating large data sets to detect and visualize various trends, behaviors, relationships, etc., within the data. This analysis may be performed by one or more processors, possibly processing the data in parallel, performing simulations using the data, and the like. For example, big data analysis may be performed by cloud infrastructure system 2002 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 20, cloud infrastructure system 2002 may include infrastructure resources 2030 that are utilized for facilitating the provision of various cloud services offered by cloud infrastructure system 2002. Infrastructure resources 2030 may include, for example, processing resources, storage or memory resources, networking resources, and the like. In certain examples, the storage virtual machines that are available for servicing storage requested from applications may be part of cloud infrastructure system 2002. In other examples, the storage virtual machines may be part of different systems.

In certain examples, to facilitate efficient provisioning of these resources for supporting the various cloud services provided by cloud infrastructure system 2002 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2002 may itself internally use services 2032 that are shared by different components of cloud infrastructure system 2002 and which facilitate the provisioning of services by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2002 may comprise multiple subsystems. These subsystems may be implemented in software, or hardware, or combinations thereof. As depicted in FIG. 20, the subsystems may include a user interface subsystem 2012 that enables users or customers of cloud infrastructure system 2002 to interact with cloud infrastructure system 2002. User interface subsystem 2012 may include various different interfaces such as a web interface 2014, an online store interface 2016 where cloud services provided by cloud infrastructure system 2002 are advertised and are purchasable by a consumer, and other interfaces 2018. For example, a customer may, using a client device, request (service request 2034) one or more services provided by cloud infrastructure system 2002 using one or more of interfaces 2014, 2016, and 2018. For example, a customer may access the online store, browse cloud services offered by cloud infrastructure system 2002, and place a subscription order for one or more services offered by cloud infrastructure system 2002 that the customer wishes to subscribe to. The service request may include information identifying the customer and one or more services that the customer desires to subscribe to. For example, a customer may place a subscription order for a service offered by cloud infrastructure system 2002. As part of the order, the customer may provide information identifying an application for which the service is to be provided and the one or more credentials for the application.

In certain examples, such as the example depicted in FIG. 20, cloud infrastructure system 2002 may comprise an order management subsystem (OMS) 2020 that is configured to process the new order. As part of this processing, OMS 2020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2020 may then invoke the order provisioning subsystem (OPS) 2024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 2002 as part of the provisioning process. Cloud infrastructure system 2002 may generate an application ID and select a storage virtual machine for an application from among storage virtual machines provided by cloud infrastructure system 2002 itself or from storage virtual machines provided by other systems other than cloud infrastructure system 2002.

Cloud infrastructure system 2002 may send a response or notification 2044 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 2002 and information identifying a virtual machine selected by cloud infrastructure system 2002 for an application corresponding to the application ID.

Cloud infrastructure system 2002 may provide services to multiple customers. For each customer, cloud infrastructure system 2002 is responsible for managing information related to one or more subscription orders received from the customer, maintaining customer data related to the orders, and providing the requested services to the customer. Cloud infrastructure system 2002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2002 may provide services to multiple customers in parallel. Cloud infrastructure system 2002 may store information for these customers, including possibly proprietary information. In certain examples, cloud infrastructure system 2002 comprises an identity management subsystem (IMS) 2028 that is configured to manage customer information and provide the separation of the managed information such that information related to one customer is not accessible by another customer. IMS 2028 may be configured to provide various security-related services such as identity services, which may include, for example, information access management, authentication and authorization services, services for managing customer identities and roles and related capabilities, and the like.

Figure 21:
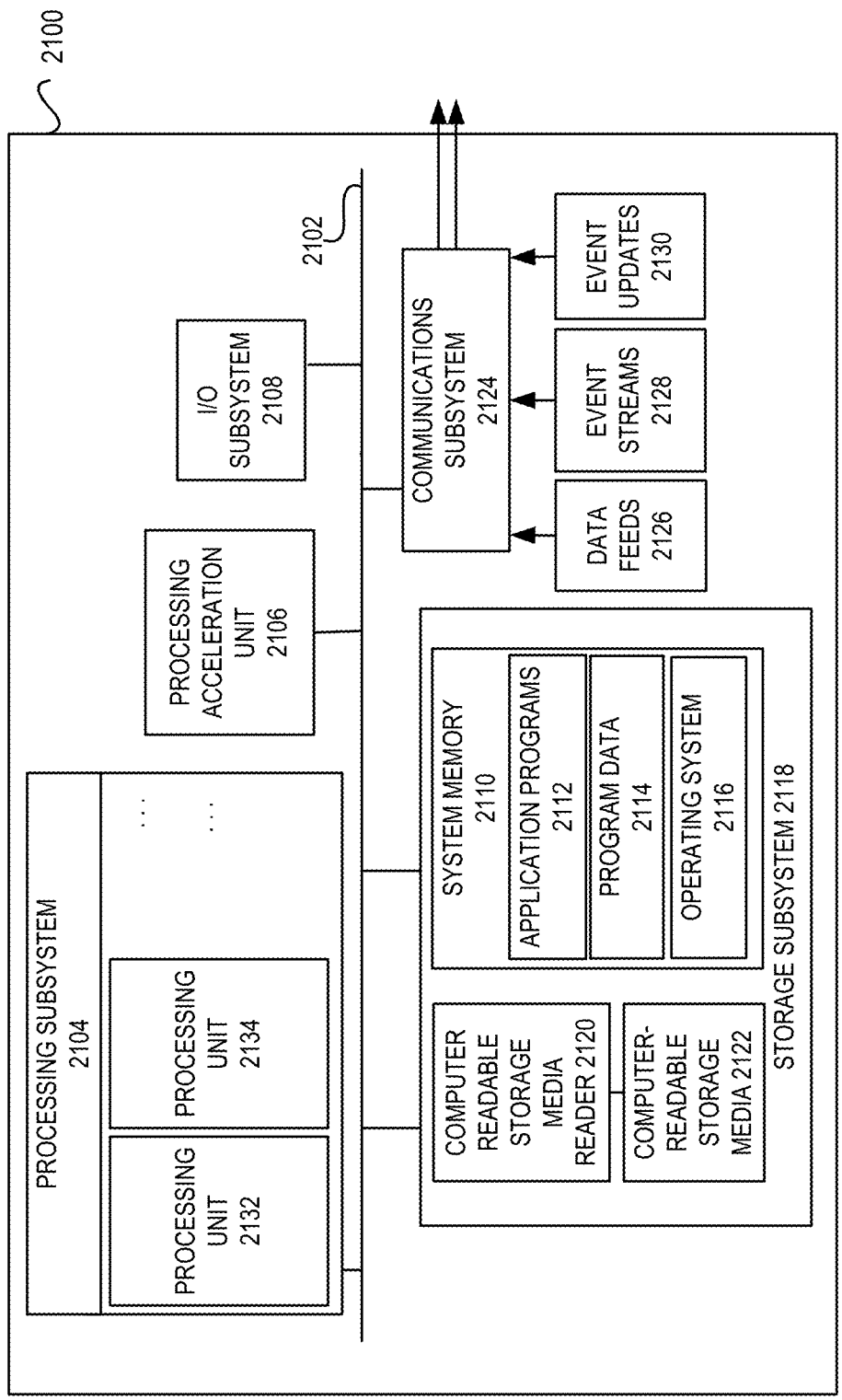
FIG. 21 illustrates an example of a computer system for implementing various embodiments.

FIG. 21 illustrates an example of computer system 2100 for implementing some embodiments. In some examples, computer system 2100 may be used to implement any of the application system, access management system, systems within a data center, and various servers and computer systems described above. As shown in FIG. 21, computer system 2100 includes various subsystems, including a processing subsystem 2104 that communicates with a number of other subsystems via a bus subsystem 2102. These other subsystems may include a processing acceleration unit 2106, an I/O subsystem 2108, a storage subsystem 2118, and a communications subsystem 2124. Storage subsystem 2118 may include non-transitory computer-readable storage media including computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative examples of the bus subsystem may utilize multiple buses. Bus subsystem 2102 may be any of several types of bus structures, including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 2104 controls the operation of computer system 2100 and may comprise one or more processors, application specific integrated circuits (ASICs), or field programmable gate arrays (FPGAs). The processors may include single core or multicore processors. The processing resources of computer system 2100 may be organized into one or more processing units 2132, 2134, etc. A processing unit may include one or more processors, one or more cores from the same or different processors, a combination of cores and processors, or other combinations of cores and processors. In some examples, processing subsystem 2104 may include one or more special purpose co-processors such as graphics processors, digital signal processors (DSPs), or the like. In some examples, some or all of the processing units of processing subsystem 2104 may be implemented using customized circuits, such as application specific integrated circuits (ASICs), or field programmable gate arrays (FPGAs).

In some examples, the processing units in processing subsystem 2104 may execute instructions stored in system memory 2110 or on computer-readable storage media 2122. In various examples, the processing units may execute a variety of programs or code instructions and may maintain multiple concurrently executing programs or processes. At any given time, some or all of the program code to be executed may be resident in system memory 2110 and/or on computer-readable storage media 2122, including potentially on one or more storage devices. Through suitable programming, processing subsystem 2104 may provide various functionalities described above. In instances where computer system 2100 is executing one or more virtual machines, one or more processing units may be allocated to each virtual machine.

In certain examples, a processing acceleration unit 2106 may optionally be provided for performing customized processing or for off-loading some of the processing performed by processing subsystem 2104 so as to accelerate the overall processing performed by computer system 2100.

I/O subsystem 2108 may include devices and mechanisms for inputting information to computer system 2100 and/or for outputting information from or via computer system 2100. In general, use of the term input device is intended to include all possible types of devices and mechanisms for inputting information to computer system 2100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader, 3D scanners, 3D printers, laser rangefinders, and eye-gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2118 provides a repository or data store for storing information and data that is used by computer system 2100. Storage subsystem 2118 provides a tangible non-transitory computer-readable storage medium for storing the basic programming and data constructs that provide the functionality of some examples. Storage subsystem 2118 may store software (e.g., programs, code modules, instructions) that when executed by processing subsystem 2104 provides the functionality described above. The software may be executed by one or more processing units of processing subsystem 2104. Storage subsystem 2118 may also provide authentication in accordance with the teachings of this disclosure.

Storage subsystem 2118 may include one or more non-transitory memory devices, including volatile and non-volatile memory devices. As shown in FIG. 21, storage subsystem 2118 includes a system memory 2110 and a computer-readable storage media 2122. System memory 2110 may include a number of memories, including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2100, such as during start-up, may typically be stored in the ROM. The RAM typically contains data and/or program modules that are presently being operated and executed by processing subsystem 2104. In some implementations, system memory 2110 may include multiple different types of memory, such as static random access memory (SRAM), dynamic random access memory (DRAM), and the like.

By way of example, and not limitation, as depicted in FIG. 21, system memory 2110 may load application programs 2112 that are being executed, which may include various applications such as Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including, without limitation, the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2122 may store programming and data constructs that provide the functionality of some examples. Computer-readable storage media 2122 may provide storage of computer-readable instructions, data structures, program modules, and other data for computer system 2100. Software (programs, code modules, instructions) that, when executed by processing subsystem 2104 provides the functionality described above, may be stored in storage subsystem 2118. By way of example, computer-readable storage media 2122 may include non-volatile memory such as a hard disk drive, a magnetic disk drive, an optical disk drive such as a CD ROM, DVD, a Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 2118 may also include a computer-readable storage media reader 2120 that may further be connected to computer-readable storage media 2122. Reader 2120 may receive and be configured to read data from a memory device such as a disk, a flash drive, etc.

In certain examples, computer system 2100 may support virtualization technologies, including, but not limited to, virtualization of processing and memory resources. For example, computer system 2100 may provide support for executing one or more virtual machines. In certain examples, computer system 2100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2100. Accordingly, multiple operating systems may potentially be run concurrently by computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to establish a communication channel to one or more client devices via the Internet for receiving and/or sending information from and/ or to the client devices. For example, when computer system 2100 is used to implement bot system 120 depicted in FIG. 1, the communication subsystem may be used to communicate with an application system and also a system executing a storage virtual machine selected for an application.

Communication subsystem 2124 may support both wired and/or wireless communication protocols. In certain examples, communications subsystem 2124 may include radio frequency (RF) transceiver components for accessing wireless voice and/or data networks (e.g., using cellular telephone technology, advanced data network technology, such as 3G, 4G, EDGE (enhanced data rates for global evolution), or 5G, WiFi (IEEE 802.XX family standards, or other mobile communication technologies, or any combination thereof), global positioning system (GPS) receiver components, and/or other components. In some examples, communications subsystem 2124 may provide wired network connectivity (e.g., Ethernet) in addition to or instead of a wireless interface.

Communication subsystem 2124 may receive and transmit data in various forms. In some examples, in addition to other forms, communications subsystem 2124 may receive input communications in the form of structured and/or unstructured data feeds 2126, event streams 2128, event updates 2130, and the like. For example, communications subsystem 2124 may be configured to receive (or send) data feeds 2126 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 2124 may be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to communicate data from computer system 2100 to other computer systems or networks. The data may be communicated in various different forms such as structured and/or unstructured data feeds 2126, event streams 2128, event updates 2130, and the like to one or more databases that may be in communication with one or more streaming data source computers coupled to computer system 2100.

Computer system 2100 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2100 depicted in FIG. 21 is intended only as a specific example. Many other configurations having more or fewer components than the system depicted in FIG. 21 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including, but not limited to, conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
    determining, by a chatbot system, a classification result for an utterance using a machine learning model, wherein the machine learning model is trained to, based on at least one input utterance, predict an intent;
    determining, by the chatbot system, a plurality of sets of anchors based on the utterance, each of the plurality of sets of anchors corresponding to one or more anchor words of the utterance, wherein determining the plurality of sets of anchors includes selecting the plurality of sets of anchors in one or more rounds using a beam search technique, wherein each anchor word of the plurality of sets of anchors exceeds a uniqueness threshold;
    for each anchor set of the plurality of sets of anchors:
        generating, by the chatbot system, based on the utterance, one or more synthetic utterances corresponding to the anchor set, each synthetic utterance of the one or more synthetic utterances comprising the one or more anchor words of the anchor set,
        determining, by the chatbot system, one or more classification results for the one or more synthetic utterances using the machine learning model, and
        determining, by the chatbot system, a confidence value for the anchor set based on the one or more classification results;
    selecting, by the chatbot system, a particular set of anchors among the plurality of sets of anchors based on a comparison of the confidence value for the particular set of anchors to a confidence threshold value;
    generating, by the chatbot system, a report comprising a representation of one or more anchor words of the particular set of anchors and particular synthetic utterances corresponding to the particular set of anchors, the particular set of anchors corresponding to the confidence value greater than the confidence threshold value;
    generating, by the chatbot system, a training dataset for retraining the machine learning model, the training dataset comprising the particular synthetic utterances; and
    retraining, by the chatbot system, the machine learning model using the training dataset.

2. The computer-implemented method of claim 1, wherein determining the confidence value for each anchor set comprises determining one or more matches between the classification result for the utterance and the one or more classification results for the one or more synthetic utterances.

3. The computer-implemented method of claim 1, wherein determining the confidence value for each anchor set comprises:
    determining, based on the one or more classification results for the one or more synthetic utterances, one or more confidence values for the one or more synthetic utterances; and
    generating, based on the one or more confidence values for the one or more synthetic utterances, the confidence value for the anchor set.

4. The computer-implemented method of claim 1, wherein each of the particular set of anchors corresponds to a confidence value greater than the confidence threshold value.

5. The computer-implemented method of claim 1, further comprising receiving, by the chatbot system, a request to generate the report for the utterance,
    wherein determining the plurality of sets of anchors is performed in response to receiving the request to generate the report.

6. The computer-implemented method of claim 1, wherein generating the one or more synthetic utterances comprises generating synthetic utterances, each of the synthetic utterances comprising the one or more anchor words of the anchor set and one or more substituted words, each of the substituted words of the synthetic utterance being variations of non-anchor words in the utterance.

7. A chatbot system comprising:
    one or more processors; and
    a non-transitory computer-readable storage medium storing computer-executable instructions that, when executed by the one or more processors, cause the one or more processors to perform operations including:
        determining a classification result for an utterance using a machine learning model, wherein the machine learning model is trained to, based on at least one input utterance, predict an intent;

determining a plurality of sets of anchors based on the utterance, each of the plurality of sets of anchors corresponding to one or more anchor words of the utterance, wherein determining the plurality of sets of anchors includes selecting the plurality of sets of anchors in one or more rounds using a beam search technique, wherein each anchor word of the plurality of sets of anchors exceeds a uniqueness threshold;

for each anchor set of the plurality of sets of anchors:
generating, based on the utterance, one or more synthetic utterances corresponding to the anchor set, each synthetic utterance of the one or more synthetic utterances comprising the one or more anchor words of the anchor set,
determining one or more classification results for the one or more synthetic utterances using the machine learning model, and
determining a confidence value for the anchor set based on the one or more classification results;

selecting a particular set of anchors among the plurality of sets of anchors based on a comparison of the confidence value for the particular set of anchors to a confidence threshold value;

generating a report comprising a representation of one or more anchor words of the particular set of anchors and particular synthetic utterances corresponding to the particular set of anchors, the particular set of anchors corresponding to the confidence value greater than the confidence threshold value;

generating a training dataset for retraining the machine learning model, the training dataset comprising the particular synthetic utterances; and retraining the machine learning model using the training dataset.

8. The chatbot system of claim 7, wherein determining the confidence value for each anchor set comprises determining one or more matches between the classification result for the utterance and the one or more classification results for the one or more synthetic utterances.

9. The chatbot system of claim 7, wherein the operations further include:
determining, based on the one or more classification results for the one or more synthetic utterances, one or more confidence values for the one or more synthetic utterances; and
generating, based on the one or more confidence values for the one or more synthetic utterances, the confidence value for the anchor set.

10. The chatbot system of claim 7, wherein generating the one or more synthetic utterances includes generating synthetic utterances, each synthetic utterances comprising the one or more anchor words of the anchor set and one or more substituted words, the substituted words of the synthetic utterance being variations of non-anchor words in the utterance.

* * * * *

UNITED STATES PATENT AND TRADEMARK OFFICE
CERTIFICATE OF CORRECTION

PATENT NO. : 12,106,055 B2  
APPLICATION NO. : 17/407692  
DATED : October 1, 2024  
INVENTOR(S) : Singaraju et al.

Page 1 of 1

It is certified that error appears in the above-identified patent and that said Letters Patent is hereby corrected as shown below:

In the Specification

In Column 33, Line 63, delete "client" and insert -- client. --, therefor.

In Column 43, Line 63, delete "610." and insert -- 610, --, therefor.

In Column 58, Line 26, delete "Bluetooth R," and insert -- Bluetooth®, --, therefor.

In Column 69, Line 27, delete "RAMS," and insert -- RAMs, --, therefor.

Signed and Sealed this  
Twenty-first Day of January, 2025

Coke Morgan Stewart  
*Acting Director of the United States Patent and Trademark Office*